(12) United States Patent
Sun et al.

(10) Patent No.: US 12,727,002 B2
(45) Date of Patent: Sep. 1, 2026

(54) SCHEDULING OF MULTIPLE CELLS USING A SINGLE DOWNLINK CONTROL INFORMATION MESSAGE

(71) Applicant: Apple Inc., Cupertino, CA (US)

(72) Inventors: Haitong Sun, Cupertino, CA (US); Hong He, San Jose, CA (US); Dawei Zhang, Saratoga, CA (US); Wei Zeng, Saratoga, CA (US); Huaning Niu, San Jose, CA (US); Seyed Ali Akbar Fakoorian, San Diego, CA (US); Sigen Ye, Whitehouse Station, NJ (US); Chunhai Yao, Beijing (CN); Ankit Bhamri, Bad Nauheim (DE)

(73) Assignee: Apple Inc., Cupertino, CA (US)

(*) Notice: Subject to any disclaimer, the term of this patent is extended or adjusted under 35 U.S.C. 154(b) by 285 days.

(21) Appl. No.: 18/447,260

(22) Filed: Aug. 9, 2023

(65) Prior Publication Data

US 2024/0057118 A1 Feb. 15, 2024

Related U.S. Application Data

(60) Provisional application No. 63/371,054, filed on Aug. 10, 2022.

(51) Int. Cl.
*G06F 15/16* (2006.01)
*H04W 72/12* (2023.01)
*H04W 72/232* (2023.01)

(52) U.S. Cl.
CPC ......... *H04W 72/232* (2023.01); *H04W 72/12* (2013.01)

(58) Field of Classification Search
CPC ... H04W 72/232; H04W 72/12; H04W 76/15; H04L 5/001; H04L 5/0053; H04L 5/0094; H04L 27/26025
See application file for complete search history.

(56) References Cited

U.S. PATENT DOCUMENTS

| | | | |
|---|---|---|---|
| 9,456,454 | B2 | 9/2016 | Gao et al. |
| 10,855,414 | B2 | 12/2020 | Zhou et al. |
| 10,863,511 | B2 | 12/2020 | Cheng |
| 11,368,967 | B2 | 6/2022 | Golitschek Edler Von Elbwart et al. |
| 2011/0149886 | A1 | 6/2011 | Xu et al. |
| 2012/0243499 | A1 | 9/2012 | Moon et al. |
| 2012/0287878 | A1 | 11/2012 | Moon et al. |
| 2021/0037502 | A1 | 2/2021 | Tsai et al. |
| 2021/0037607 | A1 | 2/2021 | Hamidi-Sepehr et al. |
| 2021/0211226 | A1 | 7/2021 | Xu et al. |

(Continued)

FOREIGN PATENT DOCUMENTS

CN 113473634 A 10/2021

OTHER PUBLICATIONS

3rd Generation Partnership Project; Technical Specification Group Radio Access Network; NR; User Equipment (UE) radio access capabilities (Release 17), 3GPP TS 38.306 V17.1.0, Jun. 2022, 224 pages.

(Continued)

*Primary Examiner* — John B Walsh
(74) *Attorney, Agent, or Firm* — Kilpatrick Townsend & Stockton LLP

(57) ABSTRACT

The present application relates to devices and components including apparatus, systems, and methods for multi-cell PUSCH/PDSCH scheduling with a single DCI in wireless communication systems.

20 Claims, 14 Drawing Sheets

(56) References Cited

U.S. PATENT DOCUMENTS

| | | | |
|---|---|---|---|
| 2021/0227569 A1 | 7/2021 | Xu et al. | |
| 2021/0250753 A1 | 8/2021 | Hosseini et al. | |
| 2021/0258999 A1 | 8/2021 | Xu et al. | |
| 2021/0274535 A1* | 9/2021 | Yi | H04W 72/0446 |
| 2021/0321440 A1* | 10/2021 | Takeda | H04W 72/535 |
| 2021/0329607 A1 | 10/2021 | Saber et al. | |
| 2021/0377918 A1 | 12/2021 | Saber et al. | |
| 2022/0329399 A1 | 10/2022 | Kittichokechai et al. | |
| 2022/0386287 A1* | 12/2022 | Noh | H04W 72/23 |
| 2023/0040333 A1 | 2/2023 | Xu et al. | |
| 2023/0057605 A1 | 2/2023 | Molavianjazi et al. | |
| 2023/0247648 A1 | 8/2023 | Oh et al. | |
| 2023/0354331 A1 | 11/2023 | Molavianjazi et al. | |
| 2025/0081202 A1 | 3/2025 | Choi et al. | |
| 2025/0301482 A1 | 9/2025 | Choi et al. | |

OTHER PUBLICATIONS

"Discussion on multi-cell PUSCH/PDSCH scheduling with a single scheduling DCI", Huawei, HiSilicon; 3GPP TSG-RAN WG1 Meeting #109-e; R1-2203135, 2022, 10 pages.

"Feature Lead Summary #6 on Multi-Cell PUSCH/PDSCH Scheduling with a Single DCI", 3GPP TSG RAN WG1 Meeting #109-E e-Meeting, R1-2205488, Moderator (Lenovo), May 9-20, 2022, 162 pages.

"Multi-cell PUSCH/PUSCH scheduling with a single DCI" , Qualcomm Incorporated, 3GPP TSG RAN WG1 Meeting #109-e, R1-2205051, 2022, 11 pages.

"Views on Multi-Cell PDSCH Scheduling via a Single DCI", 3GPP TSG-RAN WG1 #102-e, e-Meeting, R1-2006834, Qualcomm Incorporated, Aug. 17-28, 2020, 4 pages.

"Views on Rel-17 DSS Multi-Cell PDSCH Scheduling via a Single DCI", 3GPP TSG-RAN WG1 Meeting #103-e e-Meeting, R1-2008452, Apple Inc., Oct. 2020, 3 pages.

PCT/US2023/029898, "International Search Report and Written Opinion", Nov. 21, 2023, 14 pages.

PCT/US2023/029901, "International Search Report and Written Opinion", Jan. 12, 2024, 20 pages.

PCT/US2023/029901, "Invitation to Pay Additional Fees and, Where Applicable, Protest Fee", Nov. 22, 2023, 14 pages.

3GPP TS 38 212 Version 17.2.0 Release 17, Technical Specification Group Radio Access Network, Multiplex and Channel Coding, ETSI TS 138 312 V17.2.0, Jun. 2022, 201 pages.

"3GPP TS 38.213 Version 17.2.0 Release 17", 5G; NR; Physical Layer Procedures for Control, Technical Specification, ETSI TS 138 213 V17.2.0, Jul. 2022, 258 pages.

"3GPP TS 38.214 Version 17.2.0 Release 17", 5G; NR; Physical Layer Procedures for Data, Technical Specification, ETSI TS 138 214 V17.2.0, Jul. 2022, 235 pages.

"3GPP TS 38.306 Version 17.0.0 Release 17", 5G; NR; User Equipment (UE) Radio Access Capabilities, Technical Specification, ETSI TS 138 306 V17.0.0, May 2022, 175 pages.

"Revised WID on Multi-Carrier Enhancements", NTT Docomo, Inc., 3GPP TSG RAN Meeting #95e, RP-220834, Mar. 17-23, 2022, 5 pages.

"Summary of NR Dynamic Spectrum Sharing (DSS)", Moderator (Ericsson), 3GPP TSG-RAN WG1 #102-e, R1-20xxxxx , Aug. 17-28, 2020 , 19 pages.

"Summary on UE Features for URLLC/IIoT", 3GPP TSG RAN WG1 #100bis-e, R1-2002459, Apr. 20-30, 2020 , 65 pages.

"Understanding LTE-Advanced Carrier Aggregation", Lte Advanced, No. 2, Sep. 2013 , 72 pages.

"WaveJudge LTE—A Carrier Aggregation Testing", Available Online at: https://sanjole.com/wp-content/uploads/2013/08/Sanjole-WJ-LTEA-CarrAgg-Testing-Bro-0613-web.pdf, 2013, 4 pages.

Hedlund, et al. , "An Introduction to Carrier Aggregation Testing", Formerly Ascom Network Testing , 2017 , 30 pages.

Li, et al. , "Search Space Design for Cross-Carrier Scheduling in Carrier Aggregation of LTE-Advanced System", Institute of Electrical and Electronics Engineers , International Conference on Communications (ICC) , Jun. 5-9, 2011 , 5 pages.

Salihu, et al. , "New Remapping Strategy for PDCCH Scheduling for LTE-Advanced Systems" , Journal of Communications, vol. 9, No. 7 , Jul. 2014 , pp. 563-571.

Non-Final Office Action issued in U.S. Appl. No. 18/447,269, dated Dec. 3, 2025 in 28 pages.

Final Office Action issued in U.S. Appl. No. 18/447,269, dated Jun. 9, 2026 in 32 pages.

* cited by examiner

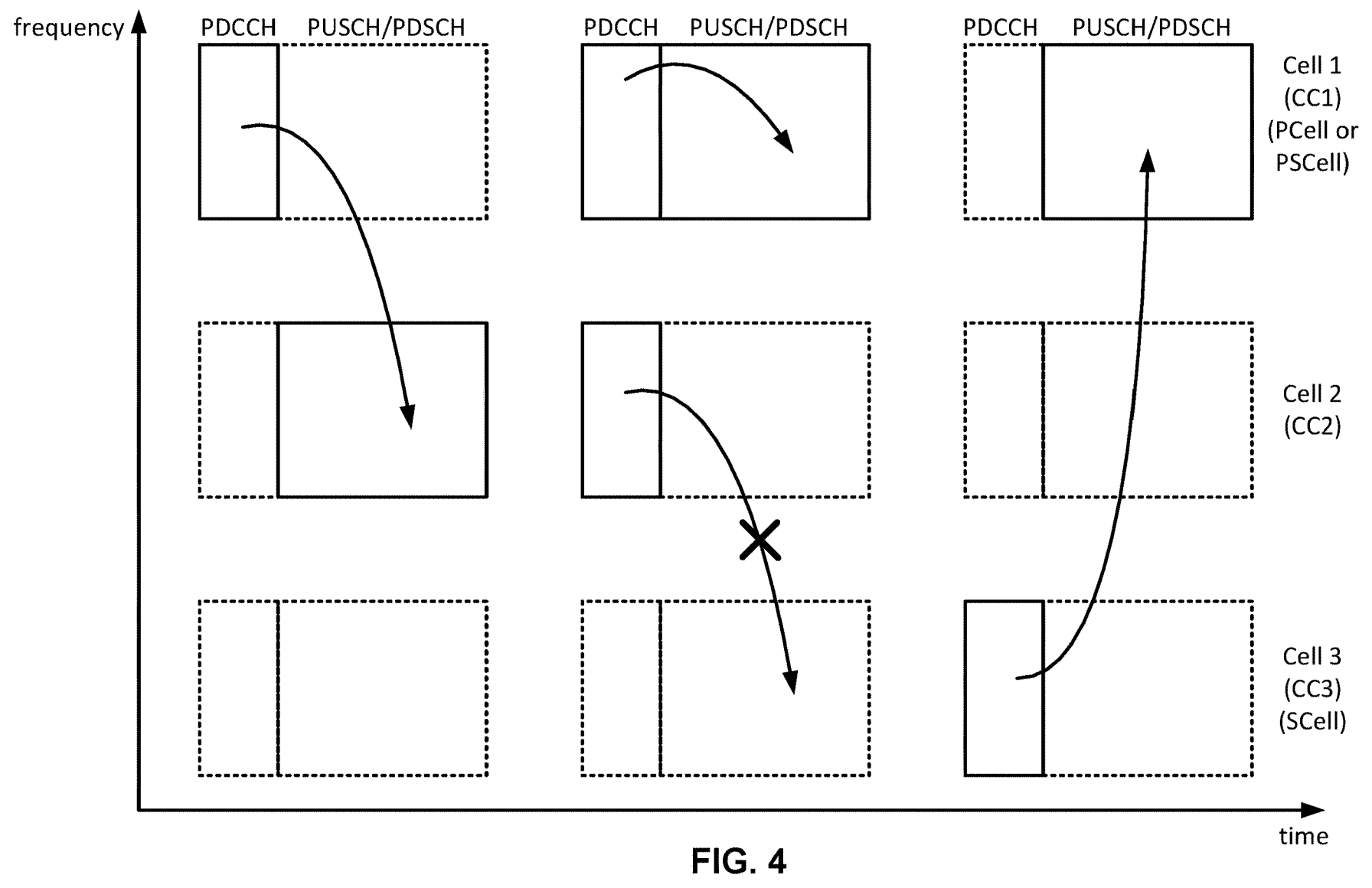

Cell 1 (CC1) (PCell or PSCell)

Cell 2 (CC2)

Cell 3 (CC3) (SCell)

PDCCH

PUSCH/PDSCH

PDCCH

PUSCH/PDSCH

PDCCH

PUSCH/PDSCH time frequency

FIG. 4

Table 10.1-3: Maximum number $C_{\text{PDCCH}}^{max,slot,\mu}$ of non-overlapped CCEs per slot for a DL BWP with SCS configuration $\mu \in \{0,1,2,3\}$ for a single serving cell

| $\mu$ | Maximum number of non-overlapped CCEs per slot and per serving cell $C_{\text{PDCCH}}^{max,slot,\mu}$ |
|---|---|
| 0 | 56 |
| 1 | 56 |
| 2 | 48 |
| 3 | 32 |

Table 10.1-3A: Maximum number $C_{\text{PDCCH}}^{max,(X,Y),\mu}$ of non-overlapped CCEs in a span for combination $(X,Y)$ for a DL BWP with SCS configuration $\mu \in \{0,1\}$ for a single serving cell

| | Maximum number $C_{\text{PDCCH}}^{max,(X,Y),\mu}$ of non-overlapped CCEs per span for combination $(X,Y)$ and per serving cell | | |
|---|---|---|---|
| $\mu$ | (2, 2) | (4, 3) | (7, 3) |
| 0 | 18 | 36 | 56 |
| 1 | 18 | 36 | 56 |

Fig. 10

Table 10.1-3B: Maximum number $C_{\text{PDCCH}}^{max,X_s,\mu}$ of non-overlapped CCEs in a group of $X_s$ slots for any combination $(X_s,Y_s)$ for a DL BWP with SCS configuration $\mu \in \{5,6\}$ for a single serving cell

| | Maximum number of non-overlapped CCEs in a group of $X_s$ slots per combination $(X_s,Y_s)$ and per serving cell $C_{\text{PDCCH}}^{max,X_s,\mu}$ | | | |
|---|---|---|---|---|
| $\mu$ | (4, 1) | (4, 2) | (8, 1) | (8, 4) |
| 5 | 32 | 32 | - | - |
| 6 | 16 | 16 | 32 | 32 |

SCHEDULING OF MULTIPLE CELLS USING A SINGLE DOWNLINK CONTROL INFORMATION MESSAGE

CROSS-REFERENCE TO RELATED APPLICATIONS

This application claims priority to U.S. provisional application No. 63/371,054, entitled "Scheduling of Multiple Cells Using a Single Downlink Control Information Message," filed on Aug. 10, 2022, the disclosure of which is incorporated by reference herein in its entirety for all purposes.

TECHNICAL FIELD

The present application relates to the field of wireless technologies and, in particular, to scheduling of multiple cells using a single downlink control information message.

BACKGROUND

Scheduling of uplink scheduling grants and downlink scheduling assignments using downlink control information (DCI) messages is described in existing Third Generation Partnership Project (3GPP) networks.

BRIEF DESCRIPTION OF THE DRAWINGS

FIG. 4 shows an example of cross-carrier scheduling in accordance with some embodiments.

FIG. 10 shows tables relating to maximum numbers of control channel elements in accordance with some embodiments.

DETAILED DESCRIPTION

Figure 1:
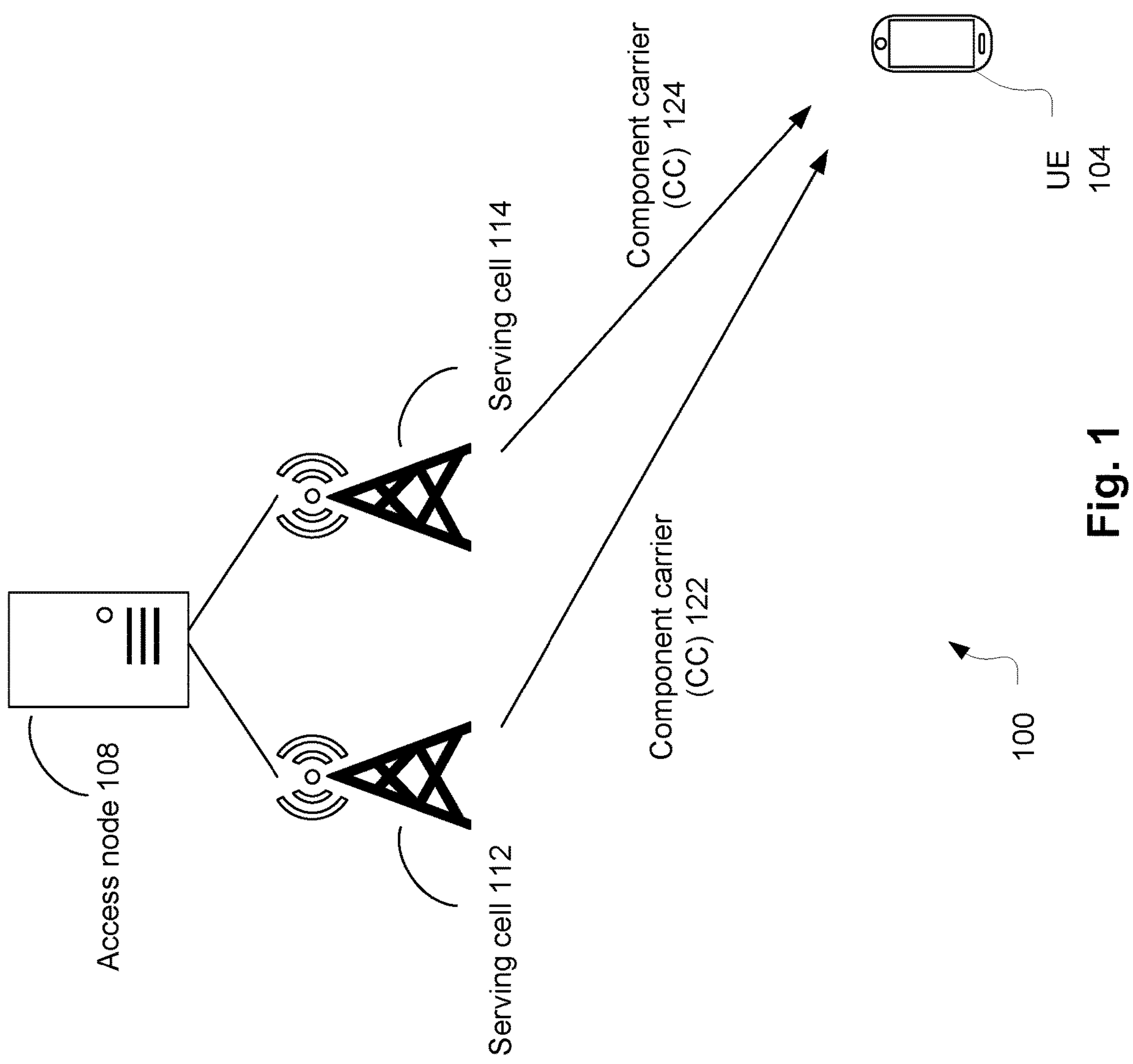
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). For the purposes of the present document, the phrase "A is based on B" means "A is based on at least B."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for multi-cell physical uplink shared channel (PUSCH)/physical downlink shared channel (PDSCH) scheduling with a single DCI are described herein. FIG. 1 illustrates a network environment 100 in accordance with some embodiments. The network environment 100 may include a UE 104 and an access node (also called a "base station," gNodeB, or next generation nodeB (gNB)) 108. The access node 108 may provide one or more wireless serving cells 112 and 114, for example, 3GPP New Radio "NR" cells, through which the UE 104 may communicate with the access node 108 (e.g., over an NR-Uu interface).

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and PDSCH transmissions. The UE may use a Physical Uplink Control Channel (PUCCH) to transmit uplink control information (UCI) to the access node 108, including, for example, hybrid-automatic repeat request (HARD) acknowledgements, scheduling requests, and periodic and semi-persistent channel state information (CSI) reports.

An access node 108 may transmit the PDCCH using resource elements that belong to a control resource set (CORESET). A search space configuration may refer to a particular CORESET to define a search space, for example, a specific set of resource blocks and symbols where the UE 104 is to attempt to decode the PDCCH. An access node 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and quasi-co-location (QCL) information to support a successful reception of the PDCCH.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

The CC 122 may be in a band in Frequency Range 1 (FR1) or in Frequency Range 2 (FR2). Likewise, the CC 124 may be in a band in FR1 or in FR2. The CCs 122 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Figure 2:
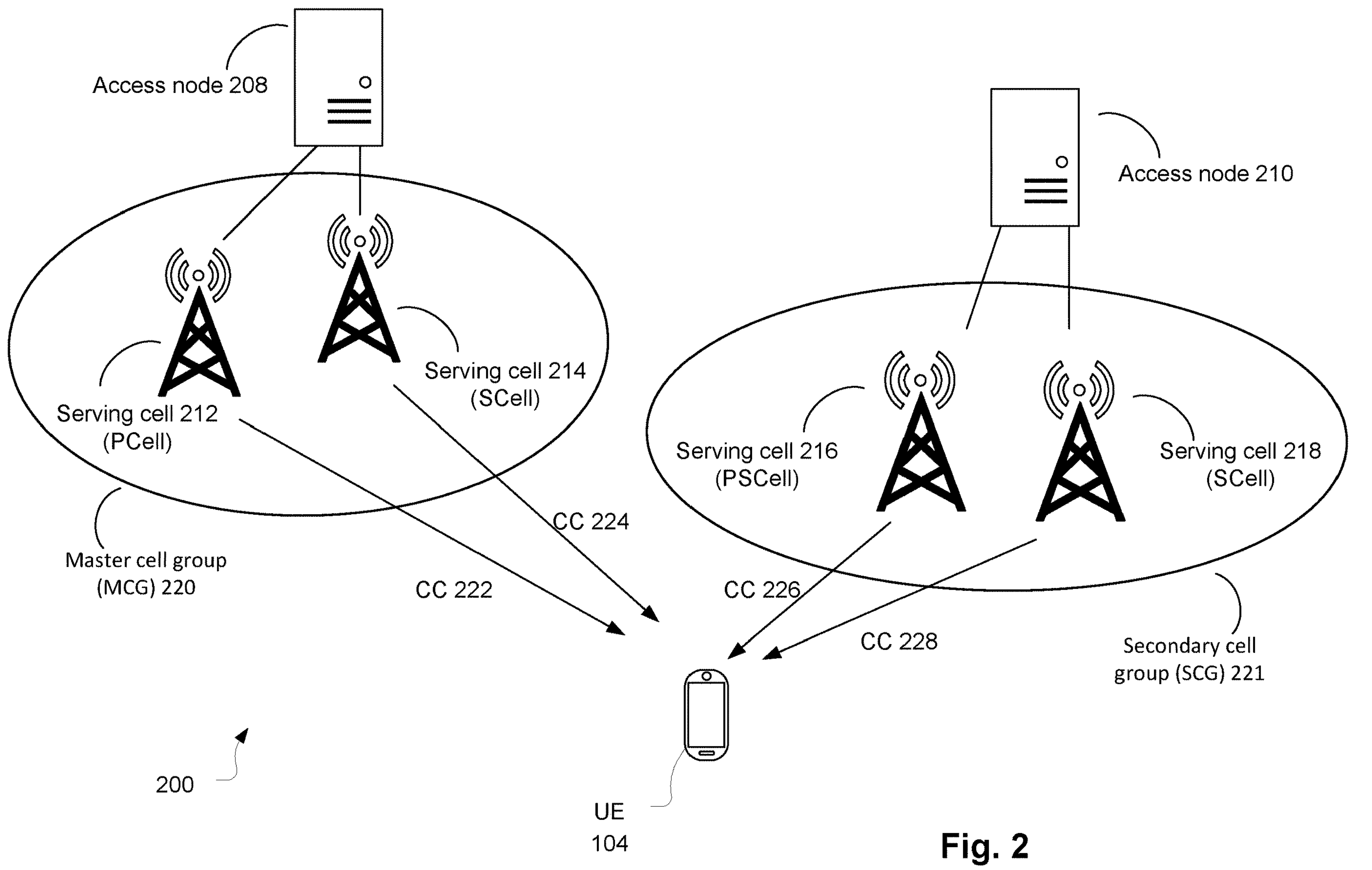
FIG. 2 illustrates a network environment in accordance with some embodiments.

FIG. 2 illustrates a network environment 200 in accordance with some embodiments. The network environment 200 may include the UE 104 and two or more access nodes (or "base stations," gNodeBs, or gNBs) 208 and 210. Each of the access nodes 208 and 210 may provide one or more wireless serving cells, for example, 3GPP New Radio (NR) cells, through which the UE 104 may communicate with the access nodes 208 and 210. In this example, access node 208 provides two serving cells 212 and 214 that communicate with the UE 104 over CCs 222 and 224, respectively, and access node 210 provides two serving cells 216 and 218 that communicate with the UE 104 over CCs 226 and 228, respectively.

The UE 104 may communicate with the access nodes 208 and 210 over an air interface compatible with 3GPP technical specifications such as those that define Fifth Generation (5G) NR system standards. Each of the access nodes 208 and 210 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

FIG. 2 illustrates an example of dual connectivity (DC), in which the UE 104 may simultaneously transmit and receive data on multiple component carriers (CCs) from two different cell groups. In this example, access node 208 is the master node that provides the control plane connection to the core network, and access node 210 is the secondary node. The master node may be coupled with a 5G core (5GC) network via a backhaul connection that may support an NG-C interface. The serving cells provided by the master node (access node 208 in this example) comprise a master cell group (MCG) 220, and the serving cells provided by the secondary node (access node 210 in this example) comprise a secondary cell group (SCG) 221. Each of the MCG 220 and SCG 221 has a primary serving cell and, optionally, one or more secondary serving cells. A primary serving cell (also called special cell or spCell) of the MCG 220 may be referred to as PCell, and a secondary serving cell of the MCG 220 may be referred to as an SCell. A primary serving cell (SpCell) of the SCG 221 may be referred to as PSCell, and a secondary serving cell of the SCG 221 may be referred to as an SCell or SSCell. In FIG. 2, serving cell 212 is the PCell, serving cell 216 is the PSCell, and serving cells 214 and 218 are SCells. The term "primary serving cell" may refer to either one of PCell and PSCell unless otherwise indicated, the term "secondary serving cell" may refer to either one of a secondary serving cell of the MCG and a secondary serving cell of the SCG unless otherwise indicated, and the term "SCell" may also refer to either one of a secondary serving cell of the MCG and a secondary serving cell of the SCG unless otherwise indicated.

Figure 3:
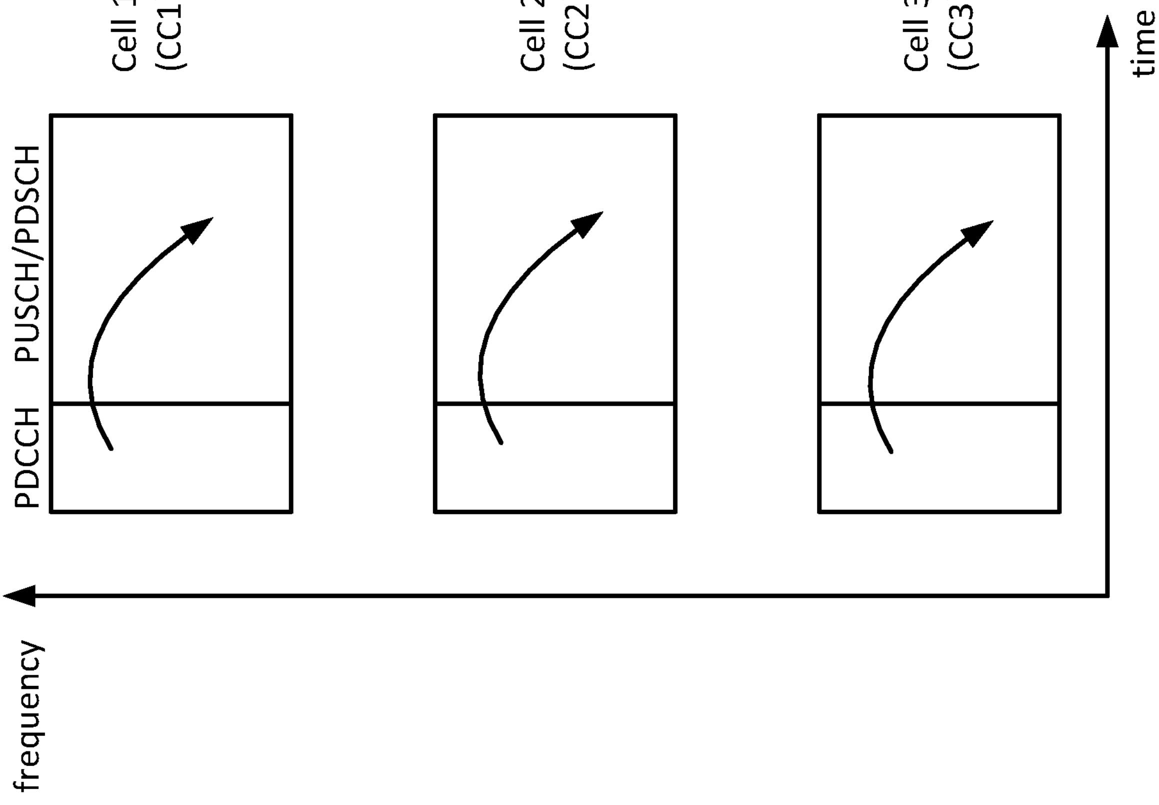
FIG. 3 shows an example of physical uplink shared channel (PUSCH)/physical downlink shared channel (PDSCH) scheduling in a carrier aggregation (CA) environment in accordance with some embodiments.

Scheduling of uplink scheduling grants and downlink scheduling assignments using downlink control information (DCI) messages is described in existing Third Generation Partnership Project (3GPP) networks. FIG. 3 shows an example in which, for each of three cells Cell1, Cell2, Cell 3 on different corresponding CCs, a DCI in the corresponding PDCCH schedules an uplink data transmission on the PUSCH or a downlink data transmission on the PDSCH.

Current versions of 5G NR support cross-carrier scheduling and carrier aggregation (CA) functionality, such that a UE can be configured with more than one component carrier (CC). Support for up to 32 CCs is currently provided. CA may be implemented to enable a better user experience by allowing a UE to access a larger bandwidth. Cross-carrier scheduling (CCS) for CA is supported in existing 5G NR. CCS may be implemented to avoid a need to monitor the control of every single CC. With CCS, one CC can be used to schedule multiple other CCs. But certain limitations may be imposed.

For example, previous releases did not permit a primary cell (PCell or PSCell) to be scheduled by another cell up to Release 17. Also, scheduling of one cell by two cells is not allowed, so that every single cell may only be scheduled by either itself or by another cell. For each scheduled cell, only one scheduling cell can be RRC configured. Mapping more than one scheduling cell to a single scheduled cell is also not allowed. A cell that is configured to be scheduled by another cell, cannot be configured to schedule any cell. Scheduling across different cell groups or different PUCCH groups is not supported. FIG. 4 shows an example in which primary Cell 1 schedules itself and is also schedules by Cell3. In this example, primary Cell 1 also schedules Cell 2, which excludes Cell 2 from scheduling another cell.

5G NR Release 17 includes some relaxation, especially on the primary cell. Basically, for the primary cell, a secondary cell is now permitted to schedule the primary cell, and also the primary cell may be scheduled by two different cells, which is one of the cells itself; the other cell is for the secondary serving cell. Such modification may allow for more flexible LTE and NR co-existence. Such modification may also provide more scheduling flexibility to the network when primary cell coexists with LTE and PDCCH monitoring on the primary is restricted due to LTE cell-specific reference signal (CRS), which is an always-on signal.

Although flexible cross-carrier scheduling is permitted, a single DCI can only be used to schedule PDSCH/PUSCH on one cell. So for every single time when a UE decodes a DCI, that DCI only schedules one cell. Even though a single cell may be allowed to schedule up to eight cells, any single DCI can only pick one of the eight cells and schedule that cell. The scheduled cell is indicated by a carrier indicator field (CIF) in the DCI, and mapping of the value of the CIF to the actual cell is configured by RRC via the parameter CrossCarrierSchedulingConfig, where configuration is per scheduled cell. So if a gNodeB wants to schedule, for example, all of the eight cells, then gNodeB needs to send eight different DCIs, each to schedule a corresponding one of the cells.

This scheduling process is based on the carrier indicator field (CIF). So the carrier indicator field is a three-bit field in the DCI, either in uplink DCI or downlink DCI. The value of the three-bit field indicates one of the eight cells, and a single cell is allowed to schedule up to eight cells. When a UE decodes a DCI, the DCI will tell the UE which one of the cells is being scheduled, either on downlink or on uplink.

Currently, if some number N of cells are to be scheduled simultaneously, then N separate DCI messages are sent, one for each scheduled cell. Such a configuration may be inefficient when simultaneous scheduling of multiple cells is frequent. Accordingly, it may be desired to configure a single DCI to schedule more than one cell, and possibly to schedule both the uplink channel (PUSCH) and the downlink channel (PDSCH). The acronym "SDSMC" is used herein to refer to a 'single DCI scheduling multiple cells.'

Currently, it is not permitted to use a cell from one cell group to schedule a cell from another cell group. Also CCS may be performed for cells within a PUCCH group, but not from one PUCCH group to another.

Figure 5:
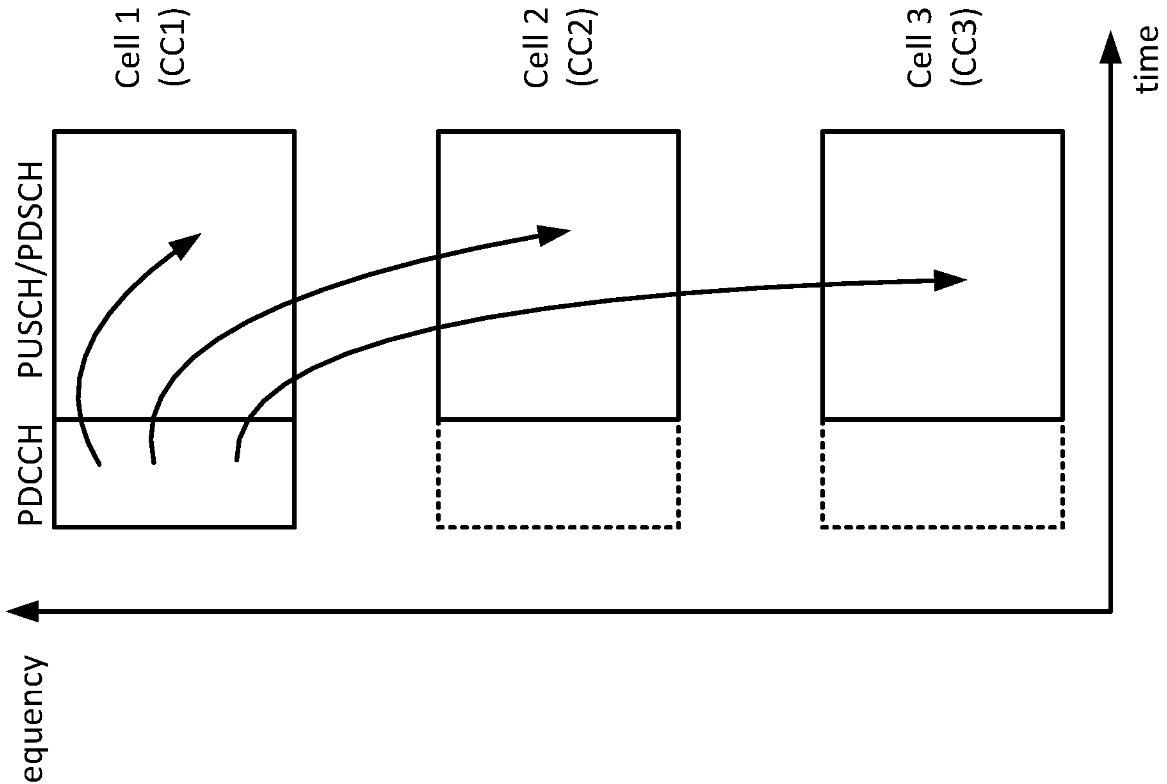
FIG. 5 shows an example of cross-carrier scheduling in accordance with some embodiments.

Techniques for multi-cell PUSCH/PDSCH scheduling with a single DCI (also called "single-DCI scheduling of multiple cells") are described herein. FIG. 5 shows an example in which a scheduling Cell 1 schedules itself and two other cells Cell2 and Cell 3 simultaneously. To some extent, a single DCI scheduling multiple cells provides certain benefits for network flexibility and reducing use of network resources. But from a UE perspective, allowing for too much flexibility in multi-cell PUSCH/PDSCH scheduling with a single DCI may adversely impact control processing. Accordingly, it may be desired to impose certain restrictions to limit the flexibility of single-DCI scheduling of multiple cells.

Limits to flexibility. Four alternative restrictions are now discussed. In a first alternative, when a single DCI is allowed to schedule PDSCH/PUSCH simultaneously in multiple cells, for each scheduled cell, it can only be configured to be scheduled by one scheduling cell. Under this restriction, even though a single scheduling cell may schedule multiple cells simultaneously, every scheduled cell may only be scheduled by one scheduling cell. Otherwise, if a scheduled cell may be scheduled by multiple scheduling cells, it may make it much more complicated for the UE in terms of how to map where a cell is scheduling, and which cell is being scheduled.

Because DCI scheduling requires the lowest turnaround time, a scheduled cell and a scheduling cell should be processed with very tight timing restrictions, and a UE may be expected to turn it around extremely fast. If the mapping is very flexible, then the mapping of the scheduling cell into the real implementation becomes more challenging. For such reasons, it may be desired to require that every scheduled cell can only be scheduled by a single scheduling cell.

Figure 6:
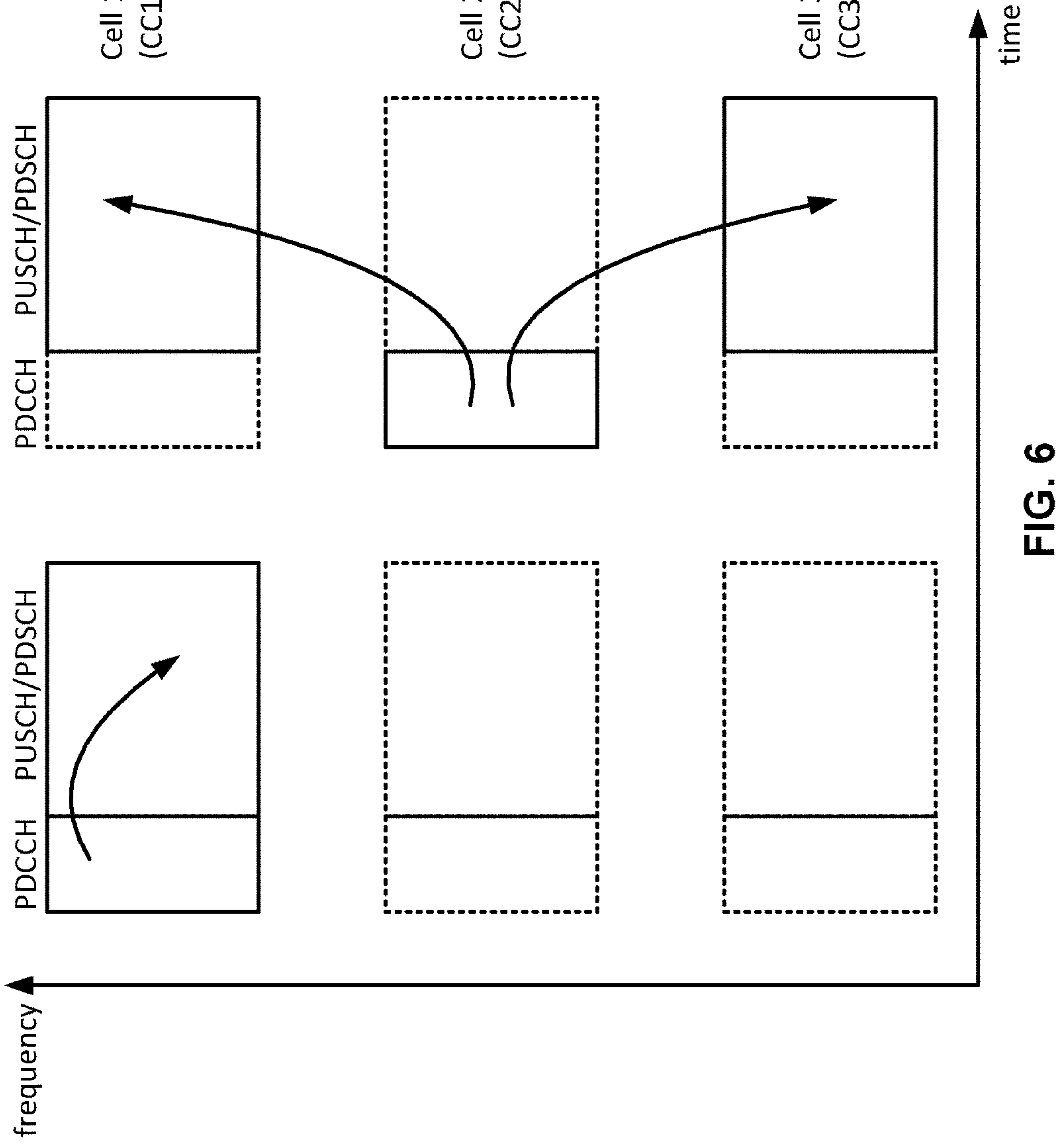
FIG. 6 shows an example of cross-carrier scheduling in accordance with some embodiments.

In a second alternative, when a single DCI is allowed to schedule PDSCH/PUSCH simultaneously in multiple cells, for each scheduled cell, it can only be configured to be scheduled by one scheduling cell when it schedules itself, and it can only be configured to be scheduled by one additional scheduling cell when it is scheduled simultaneously with one or more other cells. FIG. 6 shows an example of this second alternative in which Cell 1 is self-scheduling and is also scheduled by Cell 2, and Cell 2 also schedules Cell 3. This second alternative allows for a single scheduled cell to be scheduled by up to two scheduling cells, with the restriction that one of the scheduling cells has to be itself. Under this alternative, the scheduling is always a self-scheduling, plus another scheduling. So a single scheduled cell can only be scheduled by up to one scheduling cell that is different from itself, but possibly it can also be scheduled by itself. This alternative provides a little bit more flexibility to the network but will still limit the number of cases that the UE has to handle.

Figure 7:
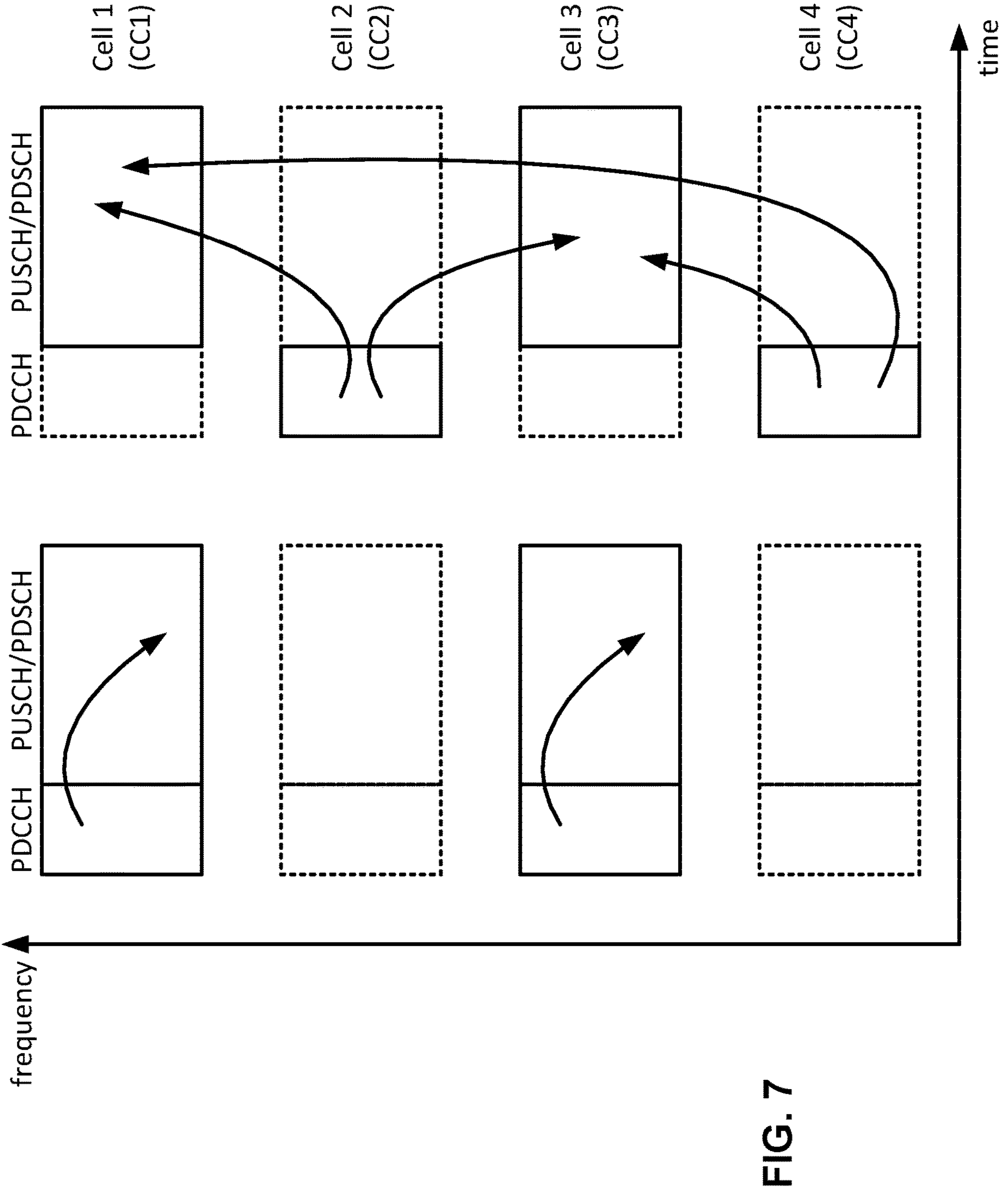
FIG. 7 shows an example of cross-carrier scheduling in accordance with some embodiments.

In a third alternative, when a single DCI is allowed to schedule PDSCH/PUSCH simultaneously in multiple cells, for each scheduled cell, it can only be configured to be scheduled by one scheduling cell when it schedules itself, and it can be configured to be scheduled by more than one additional scheduling cell when it is scheduled simultaneously with one or more other cells. FIG. 7 shows an example of this third alternative in which each of Cells 1 and 3 is self-scheduling and is also scheduled by Cells 2 and 4. This third alternative allows for even further relaxation and greater flexibility for network scheduling but increases complexity at the UE.

Figure 8:
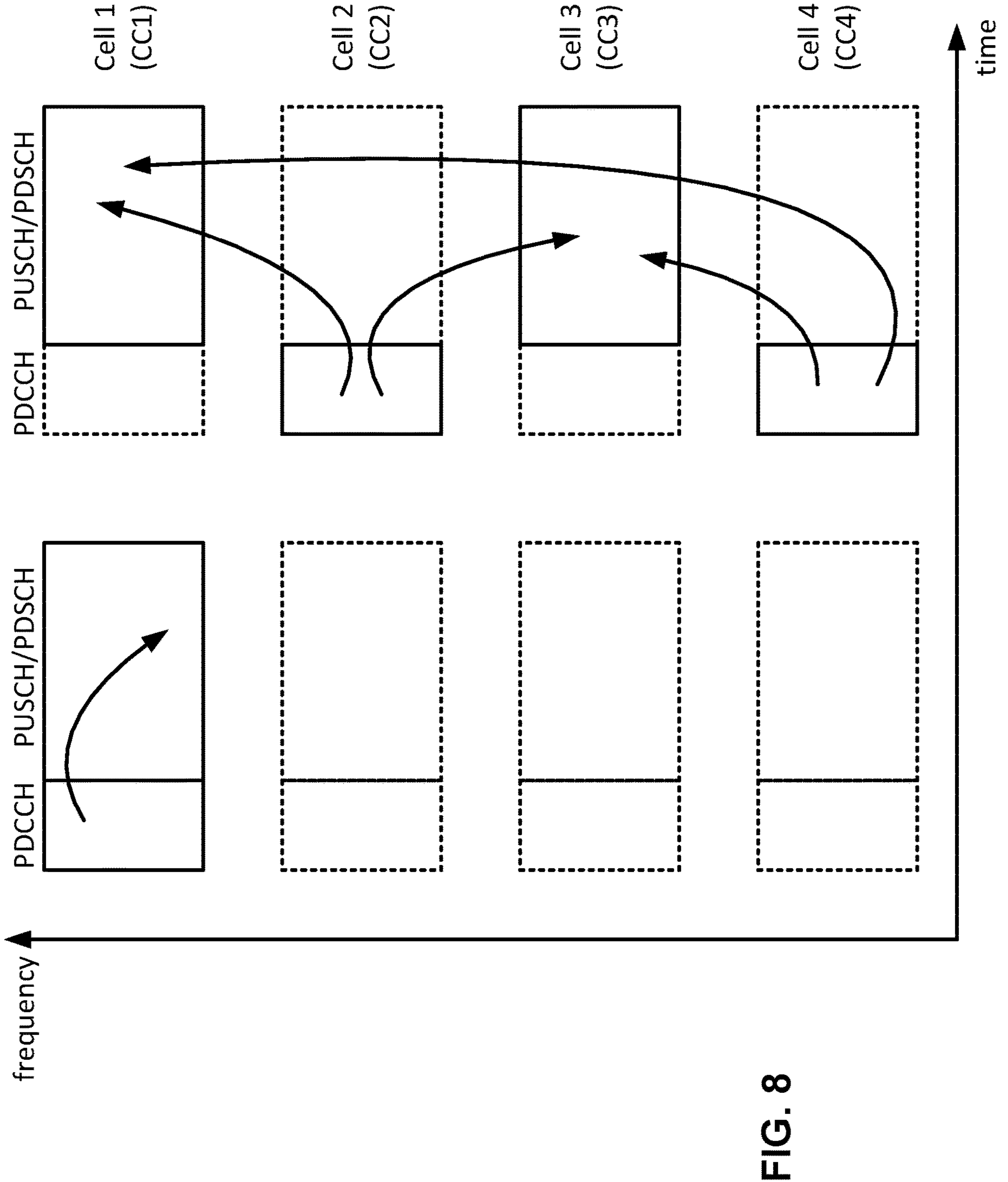
FIG. 8 shows an example of cross-carrier scheduling in accordance with some embodiments.

In a fourth alternative, when a single DCI is allowed to schedule PDSCH/PUSCH simultaneously in multiple cells, for each scheduled cell, it may be configured to be scheduled by more than one scheduling cell regardless of whether it schedules itself or is scheduled simultaneously with one or more other cells. FIG. 8 shows an example of this fourth alternative in which only Cell 1 is self-scheduling, and each of non-self-scheduling Cells 2 and 4 schedules multiple other cells. Under this alternative, a scheduled cell doesn't even have to be self-scheduled; it may be purely scheduled by another cell and it may be scheduled by several or many different other cells. For example, four different scheduling cells may be configured to be able to schedule the same scheduled cell, and the scheduled cell may not even be self-scheduling.

From the first alternative to the fourth alternative as discussed above, an increase in terms of network flexibility is seen, but at the same time the situation becomes worse for the UE implementation because the configuration becomes too flexible and there are too many cases for the UE to handle.

Self-scheduling. When a single cell is permitted to schedule multiple cells, it may be desired for at least one of the scheduled cells to be self-scheduling. For example, it may be desired for a cell to support self-scheduling before performing any cross-carrier scheduling. When the multiple scheduled cells are mapped into one of the processing units (e.g., at the UE), a mapping tool may be used to minimize the number of cells. If self-scheduling is not allowed, then support for an additional cell may be needed. When a single DCI is allowed to schedule PDSCH/PUSCH simultaneously in multiple cells, it may be desired to impose a restriction that at least one of the scheduled cells has to be self-scheduling (i.e., the same as the scheduling cell). Under such a restriction, the scheduling cell is supported.

Maximum number of scheduled cells. DCI signaling has a very low turnaround time and requires fast UE processing. Typically a UE has no more than a few microseconds to finish processing the DCI and begin decoding the PDSCH.

When a scheduling cell is permitted to schedule multiple scheduled cells simultaneously, in terms of UE implementation, a very tight latency requirement may be imposed for implementing those scheduled cells and the scheduling cell.

For every single cell supporting a certain data, typically 100 megahertz per cell, the UE may already be supporting a gigabit per second of data. If the UE is supporting four cells, then this burden may be up to 4 Gb/second or even more. The tight latency requirement to process 4 Gb/second in data, with low latency requirements, also puts a constraint on the UE side.

For such reasons, it may be desired to limit the number of cells that can be simultaneously scheduled for a single UE (for example, 2 cells, or 3 or 4). Alternatively, a UE may be allowed to report such a limit as a capability. For example, the UE may indicate a maximum number of cells it can support when a single cell is permitted to schedule multiple cells (e.g., that the network may simultaneously schedule two cells at most).

One or more restrictions may be introduced regarding the maximum number of different cells that can be scheduled together with a particular scheduling cell (e.g., two, three, four). This maximum number may be reported as a UE capability. For example, a more capable UE may report (e.g., by RRC signaling) its capability to support simultaneous scheduling of three or four cells.

Carrier indicator field. For a case in which a single DCI is permitted to schedule multiple cells, it may be desired to increase the maximum different values of CIF (Carrier Indicator Field) in the DCI that can be configured (e.g., by RRC signaling). One alternative is to keep the bit width of the CIF at three bits. Another alternative is to increase the bit width of the CIF to more than three bits, to allow each CIF in a SDSMC to indicate a corresponding one among more than eight possible values. For example, the bit width of the CIF in a SDSMC may be four bits, to allow a CIF to indicate one among more than sixteen possible values, or the bit width of the CIF in a SDSMC may be five bits, to allow a CIF to indicate one among more than 32 possible values. In such cases, the bit width of the CIF may be different for different DCI formats. A further alternative is to map one or more possible values of the CIF to more than one corresponding CC. For example, one value of the CIF may map to a first combination of two or more CCs, and another value of the CIF may map to a second combination of two or more CCs. In such case, at least one of the first combination or the second combination includes at least one CC that is not in the other of the first combination or the second combination, but it is possible that some CC may be in both of the first combination and the second combination.

Sub-carrier spacing. 5G NR provides for several different sub-carrier spacings (sub-carrier spacing, or SCS, is also called numerology), including 15 kHz, 30 kHz, 60 kHz, 120 kHz, up to 480 kHz and 960 kHz (with 240 kHz for the SSB). As the sub-carrier spacing increases, the duration of the symbol in the time domain becomes shorter, and the time-domain resolution becomes higher. The different sub-carrier spacing is thus a different time resolution of how the UE should process the signal. Each cell can only have one numerology at any given time, in that only one sub-carrier spacing may be active for the data part, but different sub-carrier spacing between the control and the data is permitted.

If every DCI is restricted to only one scheduling cell and one scheduled cell, then the UE only needs to handle two different sub-carrier spacings at most when decoding a DCI. The DCI has its own sub-carrier spacing, and as the DCI may only schedule only one cell, there is only one scheduled sub-carrier spacing. But for cases in which a single DCI is permitted to schedule multiple cells, the number of different sub-carrier spacings for the UE to handle may increase, and it may be desired to impose certain restrictions.

Complexity may be reduced for the UE if the scheduling is within the same sub-carrier spacing. When a single DCI is allowed to schedule multiple PDSCH/PUSCH simultaneously in multiple cells, in terms of numerology, the following restriction can be introduced in the specification or reported as UE capability: that all the cells simultaneously scheduled by the same scheduling cell have to have the same numerology. Under such a restriction, all the scheduled cells that are scheduled together have the same sub-carrier spacing. For example, if a single DCI schedules up to N different scheduled cells, then all of those N scheduled cells should have the same sub-carrier spacing. In this case, a single DCI would not be permitted to schedule two different cells, where DCI has an SCS of 15 kHz and both scheduled cells have an SCS of 30 kHz. The scheduled cells may have a sub-carrier spacing that is different from the sub-carrier spacing of the scheduling cell, but all of the scheduled cells have the same sub-carrier spacing. When applied to the example of FIG. 6, this restriction would require the simultaneously scheduled Cells 1 and 3 to have the same numerology.

Alternatively or additionally, when a single DCI is allowed to schedule multiple PDSCH/PUSCH simultaneously in multiple cells, in terms of numerology, the following restriction can be introduced in the specification or reported as UE capability: that all the scheduling cells that can schedule the same scheduled cell have to have the same numerology. Under such a restriction, if a scheduled cell can be scheduled by multiple scheduling cells, all the cells that can schedule the same scheduled cell should have the same sub-carrier spacing. The scheduled cell may have a sub-carrier spacing that is different from the sub-carrier spacing of the scheduling cells, but all of the scheduling cells have the same sub-carrier spacing. When applied to the example of FIG. 6, this restriction would require the scheduling Cells 1 and 2 to have the same numerology.

Other restrictions/capabilities. When a single DCI is allowed to schedule multiple PDSCH/PUSCH simultaneously in multiple cells, any one or more (possibly all) of the following restrictions can be introduced in the specification, or reported as UE capability: that all the cells simultaneously scheduled by the same scheduling cell have to be (1) in the same Frequency Range (FR1 or FR2-1 or FR2-2); (2) either all in time division duplex (TDD) band or all in frequency division duplex (FDD) band; (3) either all in licensed band or all in unlicensed band; (4) in the same Cell Group; or (5) in the same PUCCH group. When applied to the example of FIG. 6, this restriction would require both the simultaneously scheduled Cells 1 and 3, or potentially cell 2, to have the particular restriction(s).

Restriction (1) is that all of the scheduled cells simultaneously scheduled by the same scheduling cell are contained within the same frequency range. Under this restriction, the cells scheduled by an SDSMC are all in FR1, are all in FR2-1 (e.g., from 24.25 to 52.6 GHz, with sub-carrier spacing up to 120 kHz), or are all in FR2-2 (e.g., from 52.6 to 71 GHz, with sub-carrier spacing up to 480 kHz or 960 kHz).

Restriction (2) is that the scheduled cells are all in TDD band or all in FDD band. Under this restriction, if a single DCI schedules multiple scheduled cells simultaneously, all the scheduled cells should be either in FDD or TDD, such that a TDD and FDD mixture does not occur among the cells scheduled by an SDSMC.

Restriction (3) is that the scheduled cells are all in a licensed spectrum or are all in an unlicensed spectrum, so that whether the spectrum includes licensed spectrum or unlicensed spectrum, all of the cells scheduled by an SDSMC are in the same category of spectrum.

Restriction (4) is that the scheduled cells are all in the same cell group, and Restriction (5) is that the scheduled cells are all in the same PUCCH group. Under such restrictions, an SDSMC does not schedule cells from more than one cell group or from more than one PUCCH group.

Supplementary uplink (SUL). When a single DCI is allowed to schedule multiple PDSCH/PUSCH simultaneously in multiple cells, it may be desired to impose one or more restrictions relating to scheduling of a supplementary uplink (SUL, also called "supplemental uplink"). As opposed to a normal uplink (NUL), an SUL is a special uplink that has no associated downlink. An SUL is always configured in association with an NUL, meaning that the SUL and the associated NUL are configured in the same UL serving cell. An SUL does not have an associated downlink cell or any downlink operation.

An SUL may be used to enhance network coverage. A gNodeB typically transmits at about 46 or 49 dBm, but the transmit power of a UE is typically about 23 dBm, so that the difference in transmit power is about 20 dB or more. Since a UE's transmit power is so much less than a gNodeB's transmit power, the likelihood that an uplink transmission from a UE will reach the gNodeB is less than the likelihood that a downlink transmission from the gNodeB will reach the UE, and uplink coverage is usually worse than downlink coverage.

An SUL is typically configured at a lower band, as the lower the frequency, the better the propagation condition, and the signal can propagate further without decaying too much. To make a deployment more robust, a network operator may reserve some of the spectrum on a low band, configure an SUL on a specific operating frequency in the low band, and then use the SUL to carry control signaling.

When a single DCI is allowed to schedule multiple PUSCH simultaneously in multiple cells, regarding the number of SUL cells that can be scheduled simultaneously, either of the following may be implemented as a restriction or may be reported as a UE capability: (1) a maximum of one SUL, or (2) a maximum of more than one SUL. So as long as there is one component carrier in addition to the SUL, it is likely that use of a single SUL will provide sufficient coverage and that the use of multiple SULs will not be necessary. It may be desired to limit the number of SULs that can be scheduled simultaneously by a single DCI. Current DCI formats include a one-bit field which indicates whether the UE should transmit on NUL or on SUL. In the case of a DCI that can schedule more than one cell, instead of increasing the bit width of that NUL/SUL field, a simpler option may be to allow only one SUL to be scheduled simultaneously.

SUL and associated NUL. As noted above, SULs are handled differently than other carriers, in that an SUL has to be configured together with an associated NUL, and a gNodeB does not deploy an SUL by itself (in other words, without an associated NUL). Current DCI formats include a one-bit field which indicates whether the UE should toggle between the SUL and NUL, and a gNodeB does not currently schedule both an SUL and its associated NUL at the same time.

When a single DCI is configured to schedule multiple cells, it becomes possible that both an SUL and its associated NUL are simultaneously scheduled. When a single DCI is allowed to schedule multiple PUSCH simultaneously in multiple cells, regarding the SUL scheduling, the following may be implemented as a restriction or may be reported as a UE capability: an SUL cannot be scheduled together with its associated NUL simultaneously. Under such a restriction, the DCI may simultaneously schedule an SUL together with other NULs which are not associated with the scheduled SUL, but the DCI may schedule only one among an SUL and the NUL associated with the SUL, and not both.

PDSCH processing capability. Processing time is an important resource, and processing timelines are specified for downlink (PDSCH) and for uplink (PUSCH). For downlink, the PDSCH processing time is the time between the UE receiving the last symbol of the PDSCH carrying the transport block and the UE transmitting an acknowledgement (a HARQ-ACK) of the transport block back to the gNodeB. Once a UE receives the PDSCH, it should indicate to the gNodeB whether the PDSCH was received successfully or not, so that the gNodeB can determine whether retransmission of the PDSCH is needed. So after a UE receives the PDSCH, it begins to decode the PDSCH, and the UE is required to finish decoding and prepare the HARQ-ACK feedback within the PDSCH processing time, which is specified at section 5.3 ("UE PDSCH processing procedure time") of 3GPP TS 38.214 ("5G; NR; Physical layer procedures for data (3GPP TS 38.214 version 17.2.0 Release 17)," v17.2.0 (2022 July)).

5G NR indicates two levels of UE processing capability for PDSCH processing (e.g., in 3GPP TS 38.306). One is called PDSCH processing capability 1 ("DLP Cap 1"), and the other is called PDSCH processing capability 2 ("DLP Cap 2"). For DLP Cap 1, the permitted PDSCH processing time is much longer than for DLP Cap 2, which is for very low latency communication. DLP Cap 2 requires a much faster UE processing turnaround time from receiving the PDSCH to decoding the PDSCH and feeding back the corresponding HARQ-ACK.

For a case in which a single DCI can schedule multiple PDSCH, the UE will probably spend even more time to process the PDCCH to obtain the DCI payload, and then it will have to start decoding multiple PDSCH simultaneously, putting even more of a processing requirement on the UE. For such reasons, it may be desired to avoid imposing a low-latency requirement on the UE in this case. For example, it may be desired to limit low-latency UE processing to cases of dedicated scheduling by a DCI, in which a single cell schedules another cell.

When a single DCI is allowed to schedule multiple PDSCH simultaneously in more than one cell, regarding PDSCH processing capability (DLP Cap 1 or DLP Cap 2), either of the following may be implemented as a restriction or may be reported as a UE capability: (1) PDSCH processing capability 2 is not supported, or (2) either all scheduled cells follow PDSCH processing capability 1, or all scheduled cells follow PDSCH processing capability 2.

If a single cell is permitted to schedule more than one cell, then some tradeoff may be anticipated. For example, the network may no longer expect the UE to perform very low latency turnaround. Under restriction (1), only DLP Cap 1 is supported when a single DCI is allowed to schedule multiple PDSCH simultaneously in more than one cell.

Under restriction (2), a mixture of DLP Cap 1 and DLP Cap 2 is excluded. For example, if two cells are scheduled simultaneously, then the network would not require low-latency PDSCH processing on one of the cells and normal-latency PDSCH processing on the other cell. Either low-latency PDSCH processing is performed on all of the cells scheduled simultaneously, or normal-latency PDSCH processing is performed on all of the cells scheduled simultaneously.

PUSCH processing capability. For uplink, the processing time is essentially the latency between the DCI and uplink transmission: after the UE receives the DCI, the time required for it to decode the DCI and prepare the uplink waveform and transmit the scheduled PUSCH.

5G NR also indicates two levels of UE processing capability for PUSCH processing (e.g., in 3GPP TS 38.306). One is called PUSCH processing capability 1 ("DUP Cap 1"), and the other is called PUSCH processing capability 2 ("DUP Cap 2"). DUP Cap 1 is the normal latency and DUP Cap 2 is the low latency.

As in the PDSCH case, it may be desired to support only the normal latency transmission, and otherwise, even if low latency is supported, the gNodeB should not configure a mixed operation.

When a single DCI is allowed to schedule multiple PDSCH simultaneously in more than one cell, regarding PUSCH processing capability (DUP Cap 1 or DUP Cap 2), either of the following may be implemented as a restriction or may be reported as a UE capability: (1) PUSCH processing capability 2 is not supported, or (2) either all scheduled cells follow PUSCH processing capability 1, or all scheduled cells follow PUSCH processing capability 2.

Under restriction (2), a mixture of DUP Cap 1 and DUP Cap 2 is excluded. For example, if two cells are scheduled simultaneously, then the network would not require low-latency PUSCH processing on one of the cells and normal-latency PUSCH processing on the other cell. Either low-latency PUSCH processing is performed on all of the cells scheduled simultaneously, or normal-latency PUSCH processing is performed on all of the cells scheduled simultaneously.

Figure 9:
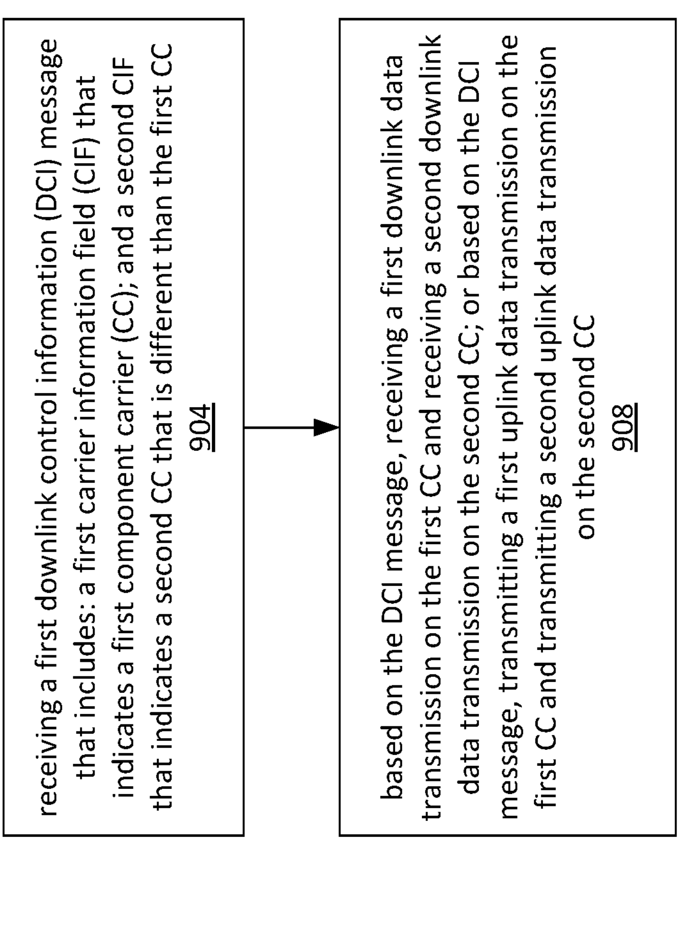
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by a UE such as, for example, UE 104 or UE 1300; or components thereof, for example, baseband processor circuitry 1304A.

The operation flow/algorithmic structure 900 may include, at 904, receiving a first downlink control information (DCI) message that includes: a first carrier information field (CIF) that indicates a first component carrier (CC); and a second CIF that indicates a second CC that is different than the first CC.

The operation flow/algorithmic structure 900 may further include, at 908, based on the DCI message, receiving a first downlink data transmission on the first CC and receiving a second downlink data transmission on the second CC; or based on the DCI message, transmitting a first uplink data transmission on the first CC and transmitting a second uplink data transmission on the second CC.

Most of a UE's power may be spent on control monitoring. Although some traffic is periodic (e.g., voice), most of the traffic is aperiodic, so the UE does not know when the traffic is going to arrive. Most of the time, no traffic is scheduled, but in order to support low latency and to prepare for any unpredictable scheduling of an arrival of a packet, the UE continues to decode the control.

The network has a task to schedule multiple users. In order for the gNodeB to have the flexibility to schedule multiple users at the same time, it is provided with multiple control and transmission possibilities for each DCI. The UE's task then is to search for the DCI among the multiple control and transmission possibilities, which is called "blind detection."

For each PUCCH monitoring occasion, the UE will try multiple different control hypotheses, and the maximum number of control hypotheses which the UE is expected to try is limited. These limits are discussed, for example, in section 10.1 ("UE procedure for determining physical downlink control channel assignment") of 3GPP TS 38.213 ("5G; NR; Physical layer procedures for control (3GPP TS 38.213 version 17.2.0 Release 17)," v. 17.2.0 (2022 July)), which specifies maximum numbers of monitored PDCCH candidates (control hypotheses) and non-overlapped control channel elements (CCEs) per slot for a DL bandwidth part for a single serving cell for different numerologies. For an SCS of 15 kHz, for example, the UE should be able to try up to 44 different control hypotheses in order to detect whether the gNodeB has scheduled a data transmission.

Counting the number of blind detections per serving cell. As discussed above, the UE indicates a maximum number of PDCCH candidates and CCEs it can handle per serving cell. When a single cell is permitted to schedule multiple cells, then it becomes difficult to count the number of blind detections per serving cell. For example, consider a scheduling cell (Cell 3) that can schedule two possibilities: it can either schedule a first scheduled cell (Cell 1) by itself, or it can schedule Cell 1 and a second scheduled cell (Cell 2) simultaneously. But the UE does not know which of these possibilities has been scheduled until it decodes the DCI, and it becomes unclear how to count the blind detection.

As specified in section 4.2.7.10 of 3GPP TS 38.306, the parameter pdcch-BlindDetectionCA indicates PDCCH blind decoding capabilities supported by the UE for CA with more than 4 CCs, the parameter pdcch-BlindDetectionMCG-UE indicates PDCCH blind decoding capabilities supported for MCG when in NR DC, and the parameterpdcch-BlindDetectionSCG-UE indicates PDCCH blind decoding capabilities supported for SCG when in NR DC. When a single DCI is allowed to schedule multiple PDSCH/PUSCH simultaneously in different cells, in terms of comparing with pdcch-BlindDetectionCA, pdcch-BlindDetectionMCG-UE, pdcch-BlindDetectionSCG-UE, either of the following two alternatives may be implemented.

The first alternative is to count the same cell only one time. In the example above, Cell 1 is only counted once. When we try a blind detection on the scheduling Cell 3, then even though the DCI can schedule Cell 1, or Cell 1 and Cell 2 together, this blind detection is only counted one time. For example, if Cell 1 can be supporting 44 blind detections, each blind detection only counts for one out of the 44, and the UE may still have to try another 43 times.

The second alternative is to count the same cell multiple times. In the example above, Cell 1 is counted twice. This case is simpler for the UE. Once the UE has tried a blind detection on the control DCI, it has already tried two hypotheses. One hypothesis is the single DCI (e.g., only Cell 1 is scheduled), and the other hypothesis is that both Cell 1 and Cell 2 are scheduled simultaneously. So performing the blind detection causes two candidates to be counted out of the 44 PDCCH candidates for Cell 1.

UE reporting of blind detection capability when CA is supported. As noted above, the UE's blind detection capability (e.g., 44) is specified per cell, but when the UE supports CA operation, it may be configured with multiple cells. If the UE is expected to perform 44 blind detections when one cell is configured, then if two cells are configured, the UE may be expected to perform twice as many blind detections, and the current specification allows configuration of up to 32 cells. Then in the worst case, the UE in this example would be expected to perform 1408 (32 times 44) blind detections. To anticipate such a possibility, it may be desired for the UE to report to the gNodeB the maximum number of CC it can support, before the UE reaches a cap on the total maximum number of blind detections.

For example, the UE may indicate to the gNodeB that the maximum number of CCs it can support before a cap is eight. In other words, for up to eight CCs, the UE can linearly increase its number of blind detections. If the gNodeB configures the UE with up to eight CCs, then for every single CC, the UE can still do the specified number of blind detections. For example, if the UE's per-cell blind detection capability is 44, then in total the UE may perform 392 (44 times 8) blind detections. But if the gNodeB configures the UE with any more than that maximum number of CCs, then the UE may not be able to increase the total number of blind detections any further. In the above example, if the gNodeB configures the UE with nine CCs, the UE still only be able to do 392 blind detections, and the number of blind detections per cell may be scaled down from the specified number. A UE may separately report its capability of the total number of blind detections it can support per cell, and when the per-cell number of blind detections it can support stops scaling as the number of CCs increases.

When a single DCI is allowed to schedule multiple PDSCH/PUSCH simultaneously in different cells, in terms of UE capability reporting on the CA support, either of the following two alternatives may be implemented.

In the first alternative, the UE can separately report the equivalent of legacy (e.g., Release 15 and/or 16) parameters pdcch-BlindDetectionCA, pdcch-BlindDetectionMCG-UE, pdcch-BlindDetectionSCG-UE. If a single cell is permitted to schedule multiple cells, it would be even more challenging for the UE to support. It may be desired to allow the UE to report a separate capability, that when a single DCI can configure to schedule multiple cells, what is the number of CC that the UE can support, and the value (e.g., pdcch-BlindDetectionCA) of the number of blind detections of CCs the UE can support, until linear scaling of the per-cell number breaks. In a case of dual connectivity, the UE may report the number of blind detections per cell group separately for the MCG and for the SCG. The first alternative may be implemented with the option that the reported value has to be equal to or larger than the Rel-15/16 corresponding capability, or the first alternative may be implemented with the option that the reported value has no restrictions.

In the second alternative, the UE may report a combination, such as one or more pairs of parameters. For example, the UE may report one or more multiple pairs of combination, such as any or all of the following: (pdcch-BlindDetectionCA-r18, pdcch-BlindDetectionCA); (pdcch-BlindDetectionMCG-r18, pdcch-BlindDetectionMCG); (pdcch-BlindDetectionSCG-UE-r18, pdcch-BlindDetectionSCG-UE).

In this case, because it is possible that a gNodeB can configure a single DCI to schedule a single cell for some CC, then the gNodeB may configure a single DCI to schedule multiple cells on some other CC. So once such a mixture configuration is allowed, then UE may report its capability for operation such that on some CCs, UE may support the single self-scheduling, and on some other CCs, UE may schedule multiple CC scheduling.

A UE may report such a combination to the gNodeB that, for example, it may support up to four CCs for single cell operation, and then up to four CCs for multi cell operation. The combination may describe an envelope of how many CCs the UE can support in the legacy operation, and how many CCs the UE can support in the advanced scheme simultaneously.

How often the UE should monitor the DCI. The latency of the traffic may depend on how often the UE monitors the DCI. If the UE monitors the DCI every millisecond, for example, a worst-case scheduling delay of one millisecond may be expected. In such case, after traffic is available at the network, the network may have to wait for one millisecond before scheduling the traffic.

The basic PDCCH configuration is called Feature Group (FG) 3-1. In FG3-1, the UE monitors control only on the first three symbols of a slot. So for every slot of 14 symbols, the control has to be on the first three symbols. FG3-1 is a very basic capability monitoring. The monitoring interval depends on the sub-carrier spacing, but for the example of 15-kHz SCS, every slot is one millisecond, so the UE can monitor control every one millisecond.

For some low latency traffic, it may be desired to reduce the latency by using a different PDCCH monitoring condition, such as any of FG3-2, FG3-5a, FG3-5b, FG11-2, FG23-2-1, FG23-6-1, FG23-6-1-1, or FG23-6-2. For FG3-2, the UE still only monitors control once a slot, but the starting location can be flexible. The PDCCH is not always on the three symbols, it can start from any symbol in the slot.

The FG3-5a and FG3-5b are more advanced, gap-based schemes. Within a slot, multiple gaps may be configured, and the UE may monitor multiple gaps. For example, two gaps may be configured, with every gap being seven symbols long. The UE will monitor some of the symbols, both during the first gap and the second gap. Such a configuration essentially cuts the latency in half, so that the worst-case latency would be 0.5 millisecond, and the schemes allow up to seven gaps.

The FG11-2 is an enhanced gap-based scheme. The FG23-2-1 uses PDCCH repetition, and FG23-6-1, FG23-6-1-1, and FG23-6-2 are Single Frequency Network (SFN)-based schemes.

When a single DCI is allowed to schedule multiple PDSCH/PUSCH simultaneously in different cells, in terms of the supported PDCCH monitoring features including any or all of FG3-1 (Release 15 basic PDCCH); FG3-2 (Release 15 flexible PDCCH starting symbol); FG3-5a, FG 3-5b (Release 15 span based PDCCH monitoring); FG11-2 (Release 16 enhanced span based PDCCH monitoring); FG23-2-1 (Release 17 PDCCH repetition); or FG23-6-1, FG23-6-1-1, FG23-6-2 (Release 17 SFN (Single Frequency Network) PDCCH), any of the following three configurations may be implemented.

The first configuration is that the UE is only required to support FG3-1. If support for a single DCI to schedule multiple cells is implemented, then the gNodeB is already provided with some kind of scheduling flexibility, so that the UE should only be required to support PDCCH FG3-1. In this configuration, when support for a single DCI to schedule multiple cells is implemented, the UE is only required to support the very basic PDCCH monitoring: the first of three symbols for every slot, for any slot.

The second configuration is that for any advanced PDCCH monitoring (e.g., any of FG3-2, FG3-5a, FG3-5b, FG11-2, FG23-2-1, FG23-6-1, FG23-6-1-1, or FG23-6-2), the specification does not support the corresponding PDCCH monitoring together with scheduling multiple PDSCH/PUSCH simultaneously in different cells. In this case, PDCCH monitoring schemes other than FG3-1 are not allowed to be configured simultaneously with a single DCI scheduling multiple cells, such that when the single DCI scheduling multiple cells is configured, then the gNodeB is not permitted to configure the UE for any advanced PDCCH monitoring capability.

The third configuration is that for any advanced PDCCH monitoring (e.g., any of FG3-2, FG3-5a, FG3-5b, FG11-2, FG23-2-1, FG23-6-1, FG23-6-1-1, or FG23-6-2), an independent UE capability is introduced when multiple PDSCH/PUSCH are configured to be scheduled simultaneously in different cells, including, e.g., any of FG3-2, FG3-5a, FG3-5b, FG11-2, FG23-2-1, FG23-6-1, FG23-6-1-1, or FG23-6-2.

In this case, the UE may be configured to separately report to the gNodeB whether it supports any of these advanced PDCCH monitoring schemes together with single-DCI scheduling of multiple cells. Such a configuration may allow the UE to better control the potential complexity it has to handle for the control monitoring.

In one example the UE may support FG3-2, and it may report to the gNodeB that it supports single-DCI scheduling of multiple cells. It may be desired for the UE to also indicate to the gNodeB whether it supports both of these features simultaneously. For example, the UE may report its capability to support FG3-2 when single-DCI scheduling of multiple cells is configured simultaneously. The UE capability is sent in an RRC message (e.g., is reported on the RRC layer), and the network also sends the FG configuration in an RRC message.

DCI size alignment. When a single DCI is allowed to schedule multiple PDSCH/PUSCH simultaneously in different cells, due to the different configuration of different cells (e.g., bandwidth part (BWP) size, etc.), the bit width of each field in the DCI might be different. If the DCI size is different, then for every different DCI size, the UE may need to try a different decoding. In such case, it may be desired to perform DCI alignment.

If a single CC can schedule multiple CCs, and depending on how many CCs it can support and which CCs it can support, the DCI field size may be different. For example, if a scheduling cell Cell 3 can either schedule a Cell 1 or simultaneously schedule Cell 1 and a Cell 2, then the DCI for scheduling Cell 1 alone may be required to have a different size than the DCI for simultaneously scheduling Cell 1 and Cell 2.

It may be desired to make sure that the DCI sizes are the same. Before the UE decodes the DCI, whether the DCI is for scheduling Cell 1 or the DCI is for scheduling Cells 1 and 2 together is not known. Instead of doing two different DCI sizes, an alternative is to align the DCI size, so that the UE only needs to try one hypothesis testing.

The DCI size alignment may be determined among the multiple scheduling possibilities. One such possibility is to actually require the maximum number of size, then the DCI size should be determined based on this maximum scheduling possibility. The size of each DCI field may be determined by the maximum size for the field required among all of the CCs that can be scheduled simultaneously, and truncation may be applied to the field for other scheduled cells, either on most significant bit (MSB) or least significant bit (LSB). If the gNodeB decides to use a different scheduling possibility, then the size may be truncated, in that a larger bit width could be truncated either on MSB or LSB, and then the DCI can be used.

Alternatively, a reference scheduling possibility may be used to determine the DCI size. For example, the size of each DCI field may be determined by a reference cell, which may be configured by RRC or may be fixed (e.g., by the specification). When the scheduled cell requires a DCI field to have more bits than the reference cell does, zero bits may be appended to the field (zero-padding), either on MSB or LSB. When the scheduled cell requires a DCI field to have fewer bits than the reference cell does, truncation may be applied to the field, either on MSB or LSB. There may be some other scheduling choice that can have a larger DCI size than the reference cell, but for those particular cases, zero-padding may be performed.

When single DCI is allowed to schedule multiple PDSCH/PUSCH simultaneously in different cells, due to the different configuration of different cells such as BWP size, etc., the bit width of each field in DCI might be different, DCI alignment is performed. Either of the following may be implemented: (1) The DCI field size is determined by the maximum size required by all CCs that can be scheduled simultaneously for each field, and truncation is applied to the other scheduled cells (e.g., either MSB or LSB); (2) The DCI field size is determined by a reference cell, which may be either configured by RRC or fixed (e.g., specified in a specification), and when the scheduled cell requires more bits than the reference cell, zero bits may be appended (zero-padding) either on MSB or LSB, and when the scheduled cell requires fewer bits than the reference cell, truncation may be applied either on MSB or LSB.

In one example, four different DCI sizes are used: 60 bits, 62 bits, 64 bits, and 66 bits. Instead of trying all four sizes, a UE may be configured to use the 64-bit size as a reference. For scheduling a DCI of size 60, 62, or 64 bits, the gNodeB uses a DCI size of 64 bits, so the UE will try 64 bit. If the gNodeB wants to schedule a DCI of size 66 bits, it may use a DCI size of 66 bits. In this case, the UE is only required to monitor DCI sizes of 64 or 66. Such a scheme provides a balance: instead of trying all possible DCI sizes, DCI size alignment is used for a subset of DCI, and more than one DCI size may be allowed in order to have a tradeoff.

In the example above, there are four possible schedulings. One scheduling requires 60 bits, the other ones require 62, 64, and 66 bits, respectively. Before the UE decodes the DCI, the size is unknown. So the solution could be that the network only has two choices: 64 bits or 66 bits. To schedule a DCI of size 60 bits, the network may use a size of 64 bits by padding some zero bite. If the network wants to schedule a DCI of size 62 bit, it may also use a size of 64 bits by padding some zero bits. The 64-bit size may be used to cover size of 60, 62, and 64 bits by doing some zero padding (e.g., adding some zeroes).

In this example, if the network wants to schedule a DCI of size 66 bits, then an option is for the network to do a truncation. For example, the network may simply truncate the 66 bits to 64 bits, and it may still transmit a DCI of size 64 bits. So essentially, 64 bits would be used, but there would be both a padded solution and also a truncation.

BD and CCE. As mentioned above, at every given time, the UE will try multiple different control hypotheses (blind detections), and the UE will also try multiple different channel estimation hypotheses (CCEs). The maximum number of control hypotheses and channel estimation hypotheses which the UE is expected to try is limited, and these limits are discussed in section 10.1 of 3GPP TS 38.213. FIG. 10 shows Tables 10.1-3, 10.1-3A, and 10.1-3B which define maximum numbers of CCEs for a single serving cell. As mentioned above, for an SCS of 15 kHz, the UE should be able to try up to 44 different control hypotheses in order to detect whether the gNodeB has scheduled a data transmission. The corresponding number of non-overlapping CCEs is 56, as shown in Table 10.1-3 in FIG. 10.

When single-DCI scheduling of multiple cells is configured, it may be desired for the maximum numbers of blind detections and non-overlapping CCEs that the UE is expected to evaluate to be less than the numbers indicated in section 10.1 of 3GPP TS 38.213. Implementation of single-DCI scheduling of multiple cells should have some certain benefit for the UE. As mentioned above, blind detection on the UE is implemented to give the gNodeB scheduling flexibility for multiple users, so that the gNodeB can arrange the scheduling for multiple users on multiple cells simultaneously so that they do not conflict (such conflicts are called scheduling blocking or TDD blocking).

But implementing single-DCI scheduling of multiple cells should greatly reduce the number of DCI that the gNodeB needs to send, so that the blocking probability should also be reduced. If the blocking probability is reduced, then the number of blind detections and non-overlapping CCEs that the UE is required to detect should also be reduced.

A UE is required to evaluate a large number of blind detections and non-overlapping CCEs because the gNodeB may need a large number of DCI in order to schedule a large number of users in the cell. But once a single DCI can achieve multiple purposes, the total number of DCI would be reduced, so that the requirement or need for the UE to detect so many blind detections and non-overlapping CCEs is also reduced. From a UE perspective, it should be possible to reduce the maximum numbers of blind detections and non-overlapping CCEs that the UE is expected to evaluate, in order for the UE to benefit from the feature of single-DCI scheduling of multiple cells.

Alternatively, the UE may report the new table, or one or more new values, to the gNodeB. For example, the UE may indicate that when single-DCI scheduling of multiple cells is configured, the maximum numbers of blind detections and non-overlapping CCEs that it may be expected to evaluate decreases (e.g., from 44 and 56, respectively, to 30 and 36). Reducing the number of transmission and blind detection evaluations that the UE is required to make should also benefit the UE by requiring less power consumption.

When a single DCI is allowed to schedule multiple PDSCH/PUSCH simultaneously in different cells, in terms of BD (Blind Detection) and non-overlapping CCE (Control Channel Element), the BD and CCE is computed per scheduling cell based on the scheduling cell SCS. For the maximum number of BD/CCE that UE can handle, any of the following may be implemented: (1) Reuse the number specified in the specification (e.g., in section 10.1 of 3GPP TS 38.213); (2) Specify a new number in the specification, which can be smaller than the number currently specified; or (3) the UE can report the new BD and CCE per SCS, and the reported number can be smaller than the number currently specified in the specification.

Overbooking. Even though the maximum number of control hypotheses and channel estimation hypotheses which the UE is expected to try is limited, the gNodeB may still configure the UE with a greater number of control hypotheses and/or channel estimation hypotheses, which is called overbooking. An overbooking gNodeB may configure, for example, 52 PDCCH candidates when the limit is only 44. But when the UE actually decodes, it potentially can skip some of the detections. The gNodeB is only permitted to perform overbooking on the primary cell, so on a secondary cell the overbooking is not allowed.

Overbooking is permitted because the gNodeB may have to schedule many different users, so that the control configuration should be shared among all those users. A gNodeB may configure more than the maximum number of blind detections for a UE in order to share a larger number of blind detections among more than one user, which provides the gNodeB with some scheduling flexibility.

When single-DCI scheduling of multiple cells is configured, once a DCI has scheduled multiple cells, then the gNodeB can accomplish the same scheduling using a much smaller number of DCIs. With the reduced number of DCIs the need for overbooking should be also reduced, so that overbooking may no longer be needed when single-DCI scheduling of multiple cells is configured.

When a single DCI is allowed to schedule multiple PDSCH/PUSCH simultaneously in different cells, in terms of overbooking, any of the following alternatives may be implemented: (1) overbooking applies to PCell that schedules itself with or without any companion cell, (2) overbooking only applies to PCell that schedules itself without any companion cell, or (3) overbooking applies to any scheduling cell that is configured to schedule PCell.

Under the first alternative, overbooking is still allowed but only on the PCell. Since now the PCell can schedule itself, it can also schedule some other cell simultaneously. It may be desired to allow overbooking on the PCell even when the PCell schedules multiple cells. Under the third alternative, the restriction of overbooking to the PCell may be relaxed so that overbooking may be applied to any cell that schedules the PCell.

Figure 11:
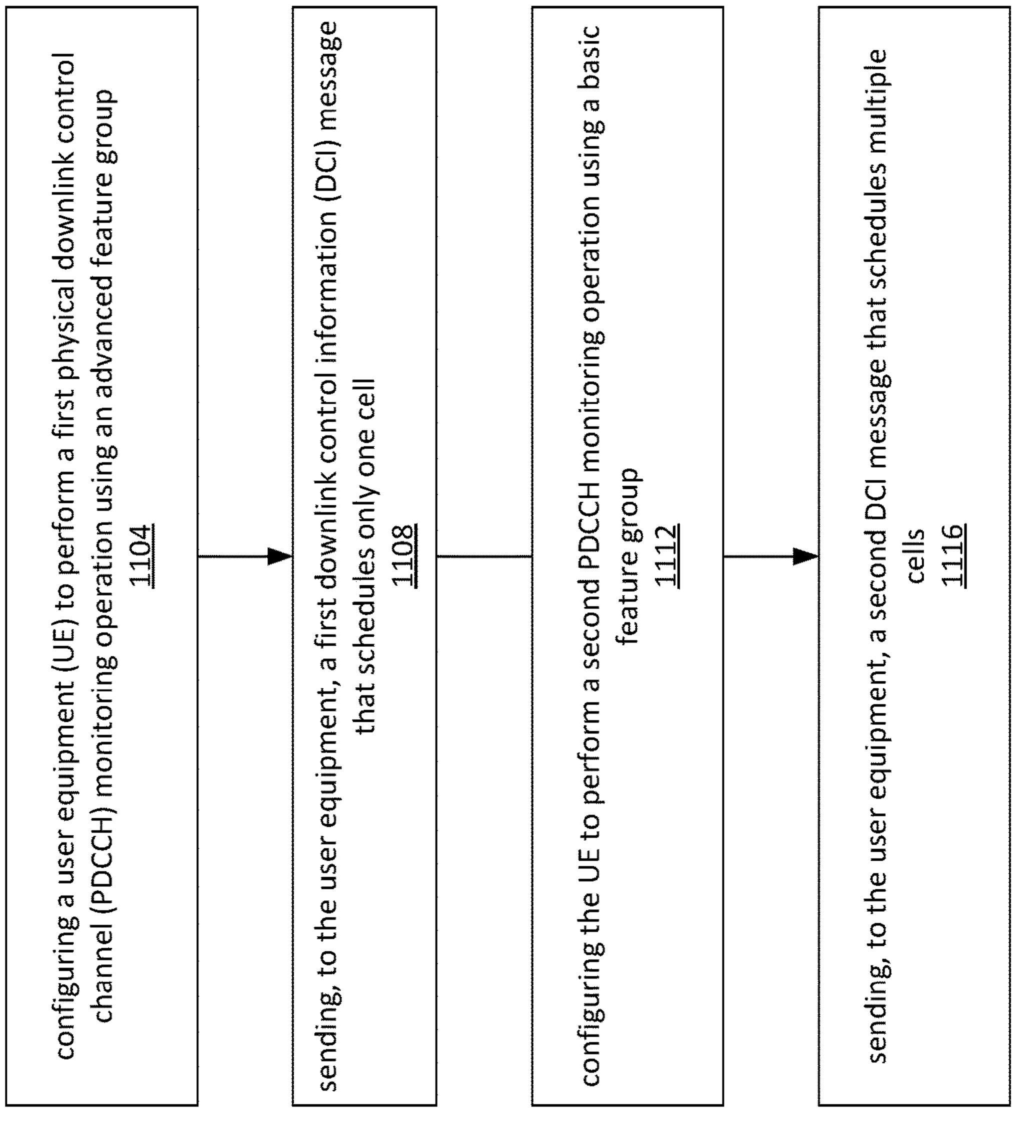
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by an access node, such as, for example, base station or access node 108, 208, 210, or 1400; or components thereof, for example, baseband processor 1404A.

The operation flow/algorithmic structure 1100 may include, at 1104, configuring a user equipment (UE) to perform a first physical downlink control channel (PDCCH) monitoring operation using an advanced feature group.

The operation flow/algorithmic structure 1100 may further include, at 1108, sending, to the user equipment, a first downlink control information (DCI) message that schedules only one cell.

The operation flow/algorithmic structure 1100 may further include, at 1112, configuring the UE to perform a second PDCCH monitoring operation using a basic feature group.

The operation flow/algorithmic structure 1100 may further include, at 1116, sending, to the user equipment, a second DCI message that schedules multiple cells.

Figure 12:
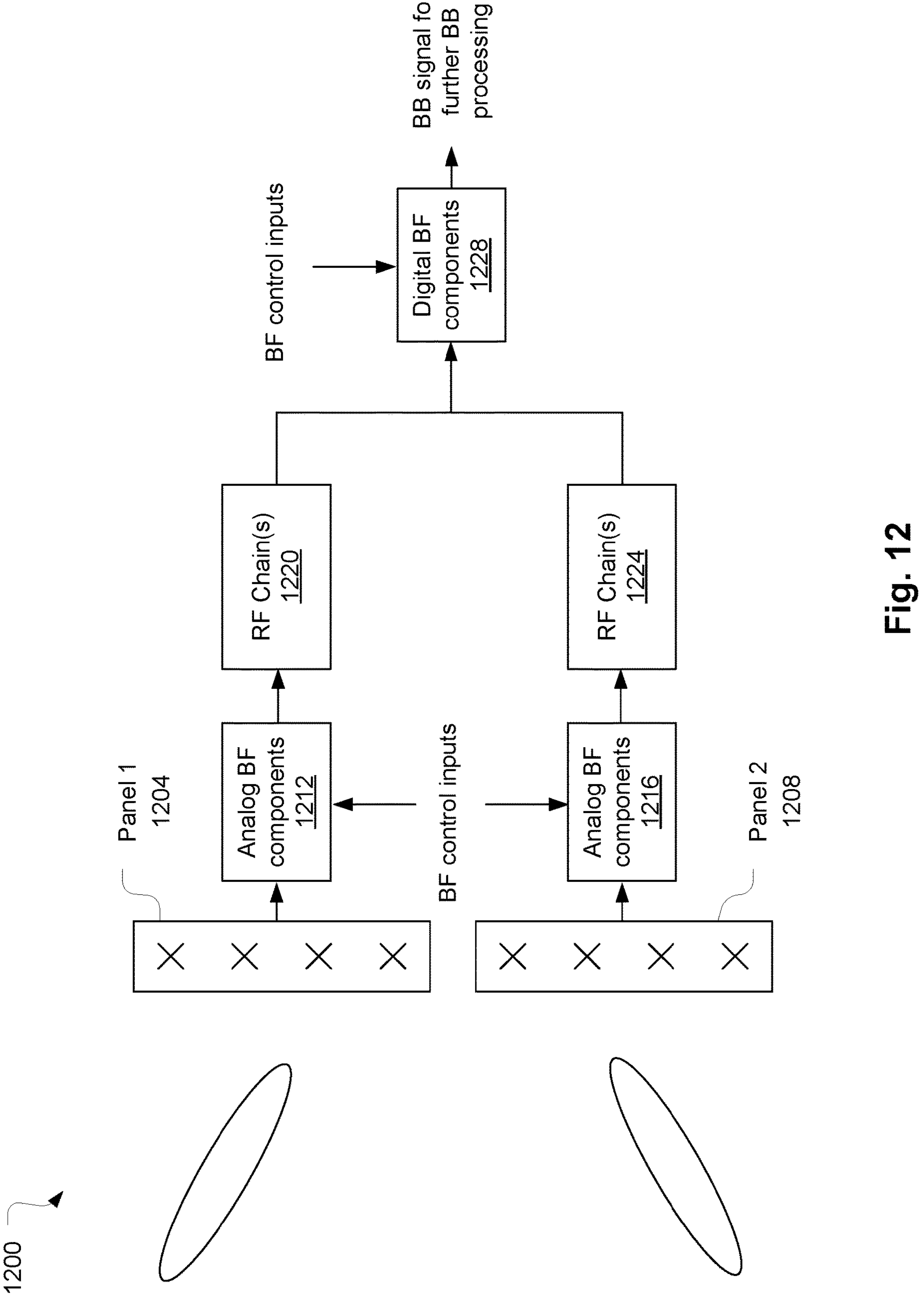
FIG. 12 illustrates beamforming components of a device in accordance with some embodiments.

FIG. 12 illustrates receive components 1200 of a device in accordance with some embodiments. The device may be the UE 104 or serving cell 112, 114, 212, 214, 216, or 218. The receive components 1200 may include a first antenna panel, panel 1 1204, and a second antenna panel, panel 2 1208. Each antenna panel may include a number of antenna elements.

The antenna panels may be coupled to respective analog beamforming (BF) components. For example, panel 1 1204 may be coupled with analog BF components 1212 and panel 2 1208 may be coupled with analog BF components 1216.

The analog BF components may be coupled with one or more radio-frequency (RF) chains. For example, analog BF components 1212 may be coupled with one or more RF chains 1220 and analog BF components 1216 may be coupled with one or more RF chains 1224. The RF chains may amplify a receive analog RF signal, downconvert the RF signal to baseband, and convert the analog baseband signal to a digital baseband signal, which may be provided to digital BF components 1228. The digital BF components 1228 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 1212 or complex weights provided to the digital BF components 1228. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 1200 describe receive beamforming, other embodiments may include beamforming components that perform transmit beamforming in analogous manners.

Figure 13:
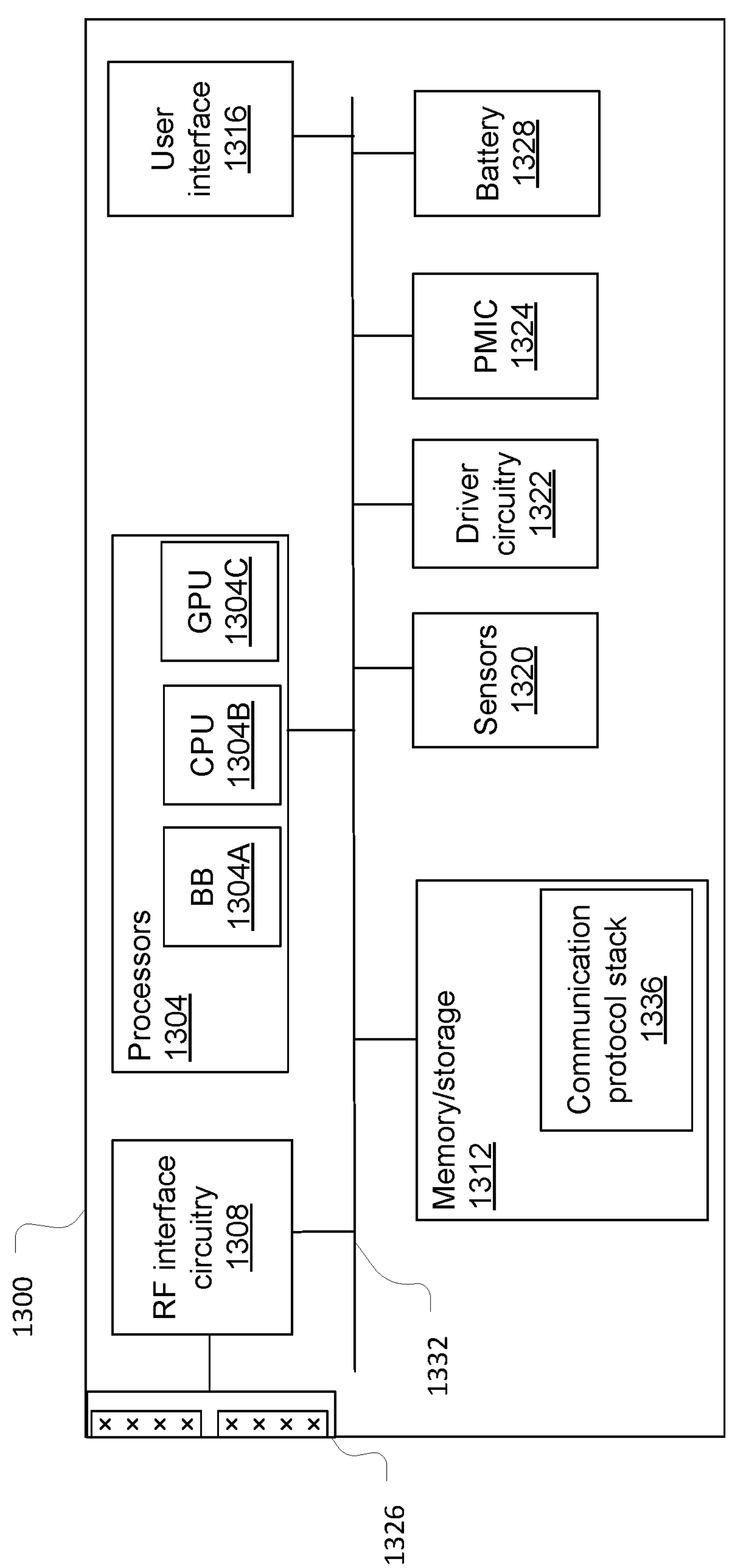
FIG. 13 illustrates a user equipment in accordance with some embodiments.

FIG. 13 illustrates a UE 1300 in accordance with some embodiments. The UE 1300 may be similar to and substantially interchangeable with UE 104 of FIGS. 1 and 2.

The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 1326.

In various embodiments, the RF interface circuitry 1308 may be configured to transmit/receive signals in a manner compatible with NR access technologies.

The antenna structure 1326 may include antenna elements to convert electrical signals into radio waves to travel through the air and to convert received radio waves into electrical signals. The antenna elements may be arranged into one or more antenna panels. The antenna structure 1326 may have antenna panels that are omnidirectional, directional, or a combination thereof to enable beamforming and multiple input, multiple output communications. The antenna structure 1326 may include microstrip antennas, printed antennas fabricated on the surface of one or more printed circuit boards, patch antennas, phased array antennas, etc. The antenna structure 1326 may have one or more panels designed for specific frequency bands including bands in FR1 or FR2.

The user interface 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensors 1320 and control and allow access to sensors 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300 including DRX as discussed herein.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
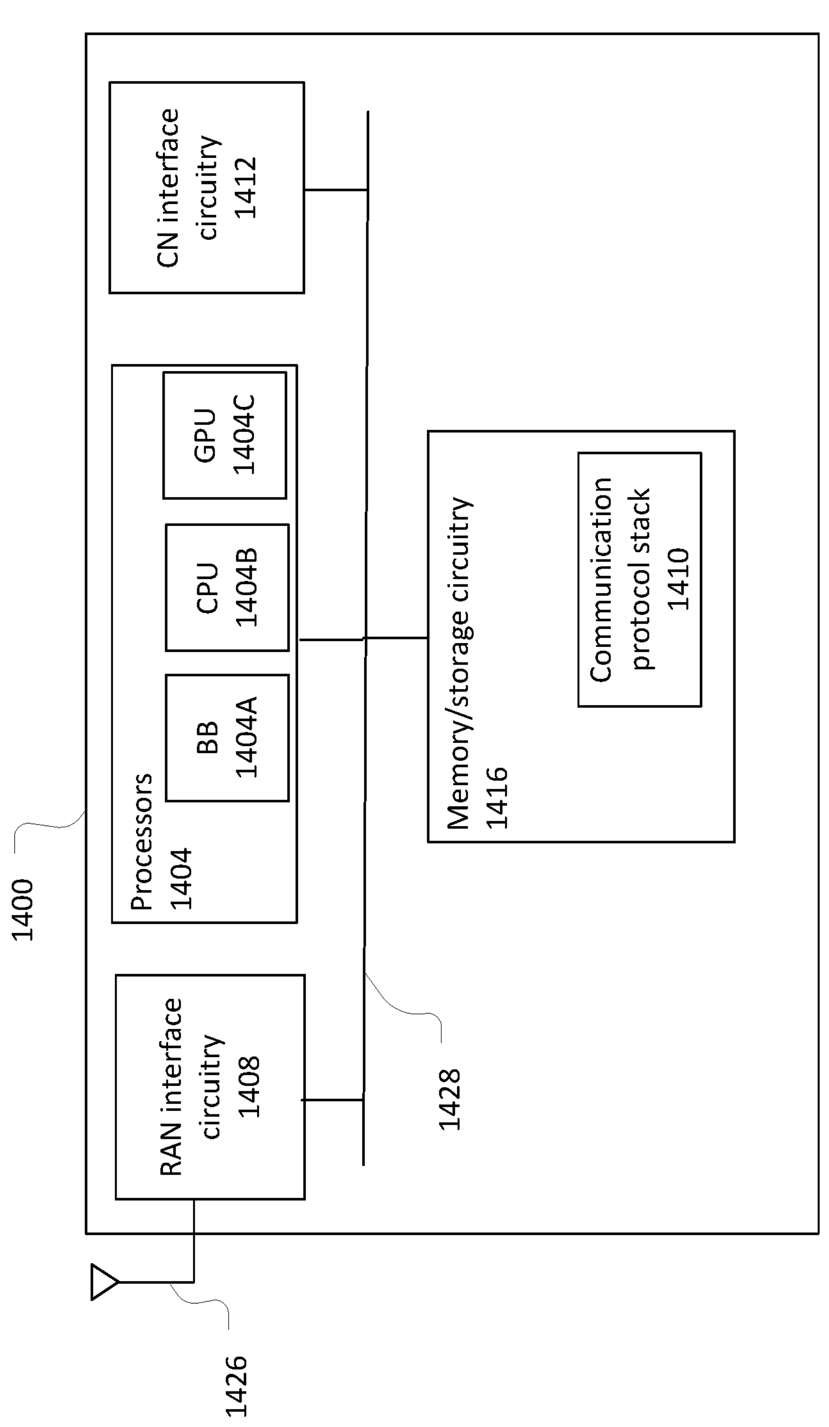
FIG. 14 illustrates a base station in accordance with some embodiments.

FIG. 14 illustrates an access node 1400 (e.g., a base station or gNB) in accordance with some embodiments. The access node 1400 may be similar to and substantially interchangeable with access node 108, 208, or 210.

The access node 1400 may include processors 1404, RF interface circuitry 1408, core network (CN) interface circuitry 1412, memory/storage circuitry 1416, and antenna structure 1426.

The components of the access node 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment, the method comprising: receiving a first downlink control information (DCI) message that includes: a first carrier information field (CIF) that indicates a first component carrier (CC); and a second CIF that indicates a second CC that is different than the first CC; wherein the method further comprises: based on the DCI message, receiving a first downlink data transmission on the first CC and receiving a second downlink data transmission on the second CC; or based on the DCI message, transmitting a first uplink data transmission on the first CC and transmitting a second uplink data transmission on the second CC.

Example 2 includes the method of Example 1 or some other example herein, wherein the DCI message does not include any other CIF.

Example 3 includes the method of Example 1 or some other example herein, wherein: the DCI message includes a third CIF that indicates a third CC that is different than the first CC and is different than the second CC, and the method further comprises, based on the DCI message, receiving a third downlink data transmission on the third CC or transmitting a third uplink data transmission on the third CC.

Example 4 includes the method of Example 3 or some other example herein, wherein the first CC and the second CC have the same numerology.

Example 5 includes the method of Example 1 or some other example herein, wherein: receiving the first DCI message comprises receiving the first DCI message on a first CC from a first base station; the method further comprises receiving, from a second base station and on a third CC that is different than the first CC and is different than the second CC, a second DCI message that includes a CIF that indicates the second CC; and the first CC and the third CC have the same numerology.

Example 6 includes the method of Example 1 or some other example herein, wherein: both of the first CC and the second CC are in Frequency Range 1; both of the first CC and the second CC are in Frequency Range 2-1; both of the first CC and the second CC are in Frequency Range 2-2; both of the first CC and the second CC are in TDD band; both of the first CC and the second CC are in FDD band; both of the first CC and the second CC are in licensed spectrum; both of the first CC and the second CC are in unlicensed spectrum; both of the first CC and the second CC are in the same cell group; or both of the first CC and the second CC are in the same PUCCH group.

Example 7 includes the method of Example 1 or some other example herein, wherein the method comprises transmitting, to a base station, an indication of a maximum number of cells that can be simultaneously scheduled for the UE in a single DCI.

Example 8 includes the method of Example 1 or some other example herein, wherein the bit width of the first CIF is greater than three.

Example 9 includes the method of Example 1 or some other example herein, wherein receiving the DCI message includes receiving the DCI message on the first CC.

Example 10 includes the method of Example 1 or some other example herein, wherein: the method comprises, based on the DCI message, transmitting the first uplink data transmission on the first CC and transmitting the second uplink data transmission on the second CC; the second CC is assigned to one among a supplementary uplink (SUL) and a normal uplink (NUL) associated with the SUL; if the second CC is assigned to the SUL, the DCI message does not schedule any data transmission on a CC assigned to the NUL; and if the second CC is assigned to the NUL, the DCI message does not schedule any data transmission on a CC assigned to the SUL.; and if the second CC is assigned to the NUL, the DCI message does not schedule any data transmission on any SUL in the same second CC.

Example 11 includes a method of operating a base station, the method comprising: generating, for a specified user equipment, a downlink control information (DCI) message that includes: a first carrier information field (CIF) that indicates a first component carrier (CC); and a second CIF that indicates a second CC; causing the base station to transmit the DCI message to the specified UE.

Example 12 includes the method of Example 11 or some other example herein, wherein the method further comprises: receiving, from the specified UE and in accordance with the DCI message, at least one of a first uplink data transmission on the first CC or a second uplink data transmission on the second CC.

Example 13 includes the method of Example 11 or some other example herein, wherein: the first CC corresponds to a first scheduled cell; the second CC corresponds to a second scheduled cell; and both of the first scheduled cell and the second scheduled cell follow PDSCH processing capability 1, or both of the first scheduled cell and the second scheduled cell follow PDSCH processing capability 2.

Example 14 includes the method of Example 11 or some other example herein, wherein: the first CC corresponds to a first scheduled cell; the second CC corresponds to a second scheduled cell; and both of the first scheduled cell and the second scheduled cell follow PUSCH processing capability 1, or both of the first scheduled cell and the second scheduled cell follow PUSCH processing capability 2.

Example 15 includes the method of Example 11 or some other example herein, wherein: the method comprises receiving, from the specified UE and in accordance with the DCI message, a first uplink data transmission on the first CC and a second uplink data transmission on the second CC; the second CC is assigned to one among a supplementary uplink (SUL) and a normal uplink (NUL) associated with the SUL; if the second CC is assigned to the SUL, the DCI message does not schedule any data transmission on a CC assigned to the NUL; and if the second CC is assigned to the NUL, the DCI message does not schedule any data transmission on a CC assigned to the SUL.

Example 16 includes the method of Example 11 or some other example herein, wherein the method further comprises receiving, from the specified UE, an indication that the UE is not capable of executing a single DCI message scheduling multiple cells that schedules more than one supplementary uplink (SUL).

Example 17 includes the method of Example 11 or some other example herein, wherein the bit width of the first CIF is greater than three.

Example 18 includes the method of Example 11 or some other example herein, wherein the method comprises receiving, from the specified UE, an indication of a maximum number of cells that can be simultaneously scheduled for the specified UE in a single DCI.

Example 19 includes the method of Example 18 or some other example herein, wherein receiving the indication comprises receiving the indication by radio resource control (RRC) signaling.

Example 20 includes the method of Example 11 or some other example herein, wherein the first CC and the second CC have the same numerology.

Example 21 includes the method of Example 1 or some other example herein, wherein: the DCI message includes a third CIF that indicates a third CC and a fourth CC; the third CC is different than the first CC and is different than the second CC, and the fourth CC is different than the third CC.

Example 22 includes a method of operating a user equipment, the method comprising: receiving a first downlink control information (DCI) message that includes: a first carrier information field (CIF) that indicates a first component carrier (CC) and a second CC that is different than the first CC; wherein the method further comprises: based on the DCI message, receiving a first downlink data transmission on the first CC and receiving a second downlink data transmission on the second CC; or based on the DCI message, transmitting a first uplink data transmission on the first CC and transmitting a second uplink data transmission on the second CC.

Example 23 includes the method of Example 6 or some other example herein, wherein receiving the DCI message includes receiving the DCI message on the first CC.

Example 24 includes the method of Example 6 or some other example herein, wherein receiving the DCI message includes receiving the DCI message on a third CC that is different than the first CC and is different than the second CC, and: all of the first CC, the second CC, and the third CC are in Frequency Range 1; all of the first CC, the second CC, and the third CC are in Frequency Range 2-1; all of the first CC, the second CC, and the third CC are in Frequency Range 2-2; all of the first CC, the second CC, and the third CC are in TDD band; all of the first CC, the second CC, and the third CC are in FDD band; all of the first CC, the second CC, and the third CC are in licensed spectrum; all of the first CC, the second CC, and the third CC are in unlicensed spectrum; all of the first CC, the second CC, and the third CC are in the same cell group; or all of the first CC, the second CC, and the third CC are in the same PUCCH group.

Example 25 may include an apparatus comprising means to perform one or more elements of a method described in or related to any of examples 1-24, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 27 may include an apparatus comprising logic, modules, or circuitry to perform one or more elements of a method described in or related to any of examples 1-24, or any other method or process described herein.

Example 28 may include a method, technique, or process as described in or related to any of examples 1-24, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof.

Example 30 may include a signal as described in or related to any of examples 1-24, or portions or parts thereof.

Example 31 may include a datagram, information element, packet, frame, segment, PDU, or message as described in or related to any of examples 1-24, or portions or parts thereof, or otherwise described in the present disclosure.

Example 32 may include a signal encoded with data as described in or related to any of examples 1-24, or portions or parts thereof, or otherwise described in the present disclosure.

Example 33 may include a signal encoded with a datagram, IE, packet, frame, segment, PDU, or message as described in or related to any of examples 1-24, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 35 may include a computer program comprising instructions, wherein execution of the program by a processing element is to cause the processing element to carry out the method, techniques, or process as described in or related to any of examples 1-24, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

generate, for transmission to a network, a capability report with an indication of support of a single downlink control information (DCI) for scheduling a plurality of cells having a same sub-carrier spacing; and identify a DCI that schedules uplink or downlink transmissions in a first cell and a second cell, wherein the first cell and the second cell have a first sub-carrier spacing.

2. The one or more non-transitory, computer-readable media of claim 1, wherein the capability report further includes an indication of support of the single DCI for scheduling the plurality of cells in a same frequency range.

3. The one or more non-transitory, computer-readable media of claim 1, wherein the capability report further includes an indication of support of the single DCI for scheduling the plurality of cells in time division duplex (TDD).

4. The one or more non-transitory, computer-readable media of claim 1, wherein the capability report further includes an indication of support of the single DCI for scheduling the plurality of cells in frequency division duplex (FDD).

5. The one or more non-transitory, computer-readable media of claim 1, wherein the capability report further includes an indication of support of the single DCI for scheduling the plurality of cells in licensed band.

6. The one or more non-transitory, computer-readable media of claim 1, wherein the capability report further includes an indication of support of the single DCI for scheduling the plurality of cells in unlicensed band.

7. A method comprising:

generating, for transmission to a network, a capability report with an indication of support of a single downlink control information (DCI) for scheduling a plurality of cells having a same sub-carrier spacing;

identifying a DCI that schedules uplink or downlink transmissions in a first cell and a second cell, wherein the first cell and the second cell have a first sub-carrier spacing; and generating one or more uplink or downlink transmissions in accordance with the DCI.

8. The method of claim 7, wherein the capability report further includes an indication of support of the single DCI for scheduling the plurality of cells in a same frequency range.

9. The method of claim 7, wherein the capability report further includes an indication of support of the single DCI for scheduling the plurality of cells in time division duplex (TDD).

10. The method of claim 7, wherein the capability report further includes an indication of support of the single DCI for scheduling the plurality of cells in frequency division duplex (FDD).

11. The method of claim 7, wherein the capability report further includes an indication of support of the single DCI for scheduling the plurality of cells in licensed band.

12. The method of claim 7, wherein the capability report further includes an indication of support of the single DCI for scheduling the plurality of cells in unlicensed band.

13. The method of claim 7, wherein the plurality of cells are in a same physical uplink control channel (PUCCH) group.

14. An apparatus comprising:

processing circuitry to:

identify that the apparatus supports a single downlink control information (DCI) for scheduling a plurality of cells having a same sub-carrier spacing;

generate, for transmission to a network, a capability report with an indication of support of the single DCI for scheduling the plurality of cells having the same sub-carrier spacing; and identify a DCI that schedules uplink or downlink transmissions in a first cell and a second cell, wherein the first cell and the second cell have a first sub-carrier spacing; and interface circuitry coupled with the processing circuitry, the interface circuitry to enable communication.

15. The apparatus of claim 14, wherein the capability report further includes an indication of support of the single DCI for scheduling the plurality of cells in a same frequency range.

16. The apparatus of claim 14, wherein the capability report further includes an indication of support of the single DCI for scheduling the plurality of cells in time division duplex (TDD).

17. The apparatus of claim 14, wherein the capability report further includes an indication of support of the single DCI for scheduling the plurality of cells in frequency division duplex (FDD).

18. The apparatus of claim 14, wherein the capability report further includes an indication of support of the single DCI for scheduling the plurality of cells in licensed band.

19. The apparatus of claim 14, wherein the capability report further includes an indication of support of the single DCI for scheduling the plurality of cells in unlicensed band.

20. The method of claim 7, wherein the capability report is for transmission from a user equipment (UE) to the network.

* * * * *